United States Patent
Matsumori et al.

(10) Patent No.: US 7,916,254 B2
(45) Date of Patent: Mar. 29, 2011

(54) LIQUID CRYSTAL DISPLAY APPARATUS FOR PERFORMING ALIGNMENT PROCESS BY IRRADIATING LIGHT

(75) Inventors: Masaki Matsumori, Hitachi (JP);
Yasushi Tomioka, Hitachinaka (JP);
Shigeru Matsuyama, Mobara (JP)

(73) Assignee: Hitachi Displays, Ltd., Chiba (JP)

( * ) Notice: Subject to any disclaimer, the term of this patent is extended or adjusted under 35 U.S.C. 154(b) by 0 days.

(21) Appl. No.: 10/973,920

(22) Filed: Oct. 27, 2004

(65) Prior Publication Data
US 2005/0088598 A1   Apr. 28, 2005

(30) Foreign Application Priority Data

Oct. 27, 2003 (JP) ................................ 2003-365409
Jul. 26, 2004 (JP) ................................ 2004-216698

(51) Int. Cl.
*G02F 1/1337* (2006.01)
*G02F 1/1343* (2006.01)

(52) U.S. Cl. .................... 349/123; 349/139; 349/141

(58) Field of Classification Search .................. 349/123, 349/139, 141
See application file for complete search history.

(56) References Cited

U.S. PATENT DOCUMENTS

| | | | |
|---|---|---|---|
| 4,345,249 A | 8/1982 | Togashi | |
| 4,897,290 A * | 1/1990 | Terasaka et al. | 427/162 |
| 6,504,591 B1 | 1/2003 | Kondo et al. | |
| 6,583,840 B1 * | 6/2003 | Inoue et al. | 349/141 |
| 6,661,492 B2 * | 12/2003 | Kim | 349/141 |
| 6,704,082 B2 * | 3/2004 | Tomioka et al. | 349/123 |
| 6,788,370 B2 * | 9/2004 | Itou et al. | 349/117 |
| 6,791,640 B1 * | 9/2004 | Okamoto et al. | 349/113 |
| 6,859,194 B2 * | 2/2005 | Aoyama et al. | 345/87 |
| 6,888,601 B2 * | 5/2005 | Asai et al. | 349/141 |
| 6,922,220 B2 * | 7/2005 | Okamoto et al. | 349/113 |
| 6,924,863 B2 * | 8/2005 | Nishida et al. | 349/141 |
| 6,958,799 B2 * | 10/2005 | Tomioka et al. | 349/141 |
| 6,995,821 B1 * | 2/2006 | Lu et al. | 349/113 |
| 2003/0095222 A1 * | 5/2003 | Wang | 349/141 |

FOREIGN PATENT DOCUMENTS

| | | |
|---|---|---|
| JP | 63-21907 | 5/1988 |
| JP | 6-22739 | 2/1994 |
| JP | 6-160878 | 6/1994 |
| JP | 9-73101 | 3/1997 |
| JP | 09-090410 A | 4/1997 |

(Continued)

OTHER PUBLICATIONS

W.M. Gibbons et al., Nature, vol. 351. pp. 49-50 (1991).

*Primary Examiner* — David Nelms
*Assistant Examiner* — Nathanael R Briggs
(74) *Attorney, Agent, or Firm* — Antonelli, Terry, Stout & Kraus, LLP.

(57) ABSTRACT

A liquid crystal display includes a pair of substrates including at least one transparent substrate, a liquid crystal layer arranged between the substrates, a plurality of electrodes formed on at least one of the substrates to apply an electric field to the liquid crystal layer, a plurality of active elements connected to the electrodes, an alignment layer formed on the surface of each of the substrates in contact with the liquid crystal layer, and an optical means formed on at least one of the substrates to change the optical characteristics in accordance with the alignment condition of the particles of the liquid crystal layer. The taper angle at the ends of the electrodes is larger than 45 degrees but less than 90 degrees.

16 Claims, 8 Drawing Sheets

FOREIGN PATENT DOCUMENTS

| | | |
|---|---|---|
| JP | 10-148826 A | 6/1998 |
| JP | 10-319409 A | 12/1998 |
| JP | 2000-356776 | 12/2000 |
| JP | 2001-354968 A | 12/2001 |
| JP | 2002-258262 A | 9/2002 |
| JP | 2003-202553 A | 7/2003 |
| JP | 2004-206091 A | 7/2004 |
| WO | WO-91/10936 | 7/1991 |

* cited by examiner

LIQUID CRYSTAL DISPLAY APPARATUS FOR PERFORMING ALIGNMENT PROCESS BY IRRADIATING LIGHT

BACKGROUND OF THE INVENTION

1. Field of the Invention

The present invention relates to a liquid crystal display, or in particular to an optical alignment layer used for the liquid crystal display.

2. Description of the Related Art

Normally, in the display operation of the liquid crystal display, the electric field is applied to the liquid crystal particles of the liquid crystal layer held between a pair of substrates, thereby changing the direction of alignment of the liquid crystal molecules and the optical characteristics of the liquid crystal layer. The conventional liquid crystal display of what is called active drive type comprising a switching element such as a thin-film transistor for each pixel is represented by the twisted nematic (TN) display system using the rotary polarization of the liquid crystal particles making up the liquid crystal layer, in which a pair of the substrates holding the liquid crystal layer each have an electrode and the electric field is applied to the liquid crystal layer in the direction substantially perpendicular to the substrate boundary. The greatest problem of the liquid crystal display of TN type is considered a narrow angular field of view.

On the other hand, JP-B-63-21907, U.S. Pat. No. 4,345,249, WO91/10936, JP-A-6-22739 and JP-A-6-160878 disclose an IPS system in which the electric field generated using the interdigital electrode formed on one of a pair of substrates has a component substantially parallel to the particular substrate and the liquid crystal particles making up the liquid crystal layer are rotated in a plane substantially parallel to the substrates to perform the display operation using the double refraction of the liquid crystal layer. The IPS system has the advantage of a wider angular field of view and a smaller load capacity than the conventional TN system due to the in-plane switching of the liquid crystal particles. The IPS system has thus seen a remarkable development recently as a promising candidate for a new liquid crystal display replacing the TN system. Also, JP-A-9-73101 discloses another IPS system with an improved transmittance in which at least one of the two electrodes for applying the electric field to the liquid crystal layer is configured of a transparent conductive film.

The liquid crystal display of IPS type (hereinafter referred to as IPS-TFT-LCD) having a superior visual angle characteristic (brightness contrast ratio, gradation and color tone inversion) with a high display brightness is a promising technique for the monitor and the TV receiver having a large display area. In the liquid crystal display, an alignment layer having the ability to align the liquid crystal particles is formed in the boundary between the liquid crystal layer and each of the two substrates holding the particular liquid crystal layer. For future practical applications of the IPS-TFT-LCD for the screen of 20 inches or larger, however, the development of a new structure and a new fabrication process suitable for a large-sized display (large-sized display panel) is required.

Especially, in the IPS-TFT-LCD having many steps on the substrate surface facing the liquid crystal layer, it is difficult to process the alignment layers to secure a uniform alignment over a large screen. The margin allowed for the alignment process executed for the alignment layer is very small as compared with the conventional TN system, or especially the normally-white TN system (bright image at low voltage, and dark image at high voltage) which is the current main stay. The reasons for the small margin are three points (1) to (3) described below.

(1) Stepped Structure

In IPS-TFT-LCD, a multiplicity of elongate electrodes (hereinafter sometimes referred to as the interdigital electrodes) having a width of about several μm are basically required to be arranged. A fine stepped structure is thus formed. The size of each step, depending on the thickness of the electrodes and the shape of the various films formed on the electrodes, is normally not less than 100 nm. In the high apertures pixel structure, a considerably thick organic insulating film is formed and the step roughness of and under the organic insulating film is flattened. Thus, the step of each alignment layer having a high aperture pixel structure is attributable mainly to the electrodes above the organic insulating film.

An alignment layer (also called the "alignment control layer") composed of a high polymer film of polyimide or the like is formed as the uppermost ones of these layers.

In the conventional mass production technique, each alignment layer is rubbed to create the ability to align the liquid crystal particles (initial alignment). The rubbing cloth is composed of a bundle of thin fibers each about 10 to 30 μm thick. The ability to align the liquid crystal particles is created substantially by the shearing force generated in a predetermined direction by each thin fiber at local portions of the alignment layer. Although a microfiber about several microns thick is available, the requirement of the rigidity to create some friction force for the rubbing application eliminates the practical applications of the microfiber. In the IPS system, the interval between the electrodes is about 10 to 30 μm and substantially equal to the diameter of the above-mentioned fiber. Therefore, in the neighborhood of each step, the rubbing is liable to be insufficient and the alignment is easily disrupted. This alignment irregularity gives rise to an increased black level with the resulting lower contrast ratio, an uneven brightness or other image quality deterioration.

(2) Orientation Angle

In IPS-TFT-LCD, the direction of initial alignment is basically required to be set at an angle displaced at least a predetermined angle from the extension of the electrodes or the direction perpendicular to the particular extension. The electrode herein is defined as a signal wiring electrode, a common electrode in the pixel or a source electrode. To define the direction of the initial alignment by rubbing, the fiber about 10 to 30 μm in size is required to be used for rubbing at a predetermined angle as described above. The wiring extending in a predetermined direction and the steps at the ends of the wiring for the signal wiring electrode, the common electrode in the pixel and the source electrode draw the fiber from a set angle to the direction of the steps and disrupts the alignment, thereby increasing the black level or otherwise deteriorating the image quality.

(3) Settlement of Black Level

One of the features of the IPS-TFT-LCD is a superior settlement of the black level (black image). As compared with other systems, therefore, the disruption of the alignment is often conspicuous. In the conventional normally white TN system, the dark level is obtained with a high voltage applied. At a high voltage, most of the liquid crystal particles are aligned in one direction of the electric field perpendicular to the substrate surface, and the dark level is obtained from the relative positions of the liquid crystal particles and the polarizing plate. The uniformity of the dark level, therefore, is not basically dependent on the initial alignment at a low voltage. Further, the human eyes recognize the brightness irregularities as a relative ratio of brightness and reacts to them almost in logarithmic scale. The human eyes, therefore, are very sensitive to the change in dark level. Also from this viewpoint, the conventional normally white TN system in which the liquid crystal particles are aligned forcibly in one direction at a high voltage makes less sensitive to the initial alignment and therefore advantageous.

The IPS system, on the other hand, in which the dark level is displayed at low or zero voltage, is more sensitive to the disruption of the initial alignment. Especially, in the configuration (called double refraction) in which the liquid crystal particles are aligned homogeneously in parallel to each other on the upper and lower substrates and the light transmission axis of one of the polarizing plates is arranged in parallel and the other polarizing plate at right angles to the direction in which the liquid crystal particles are aligned, the polarized light incident to the liquid crystal layer is propagated substantially without disruption of the linear polarization. This effectively settles the dark level.

The transmittance T of the double refraction mode is generally expressed by the equation below.

$$T = T_0 \cdot \sin^2\{2\alpha(E)\} \cdot \sin^2\{(\pi \cdot d_{\mathit{eff}} \cdot \Delta n)/\lambda\}$$

where $T_0$ is a coefficient determined mainly by the transmittance of the polarizing plate used with the liquid crystal panel, $\alpha(E)$ the angle between the direction of alignment of the liquid crystal particles (effective optical axis of the liquid crystal layer) and the polarized light transmission axis, E the applied electric field strength, $d_{\mathit{eff}}$ the effective thickness of the liquid crystal layer, $\Delta n$ the anisotropic index of refraction of the liquid crystal, and $\lambda$ the wavelength of the light. Also, the product $d_{\mathit{eff}} \cdot \Delta n$ of the effective thickness $d_{\mathit{eff}}$ of the liquid crystal layer and the anisotropic index of refraction $\Delta n$ of the liquid crystal is called the "retardation". The thickness $d_{\mathit{eff}}$ of the liquid crystal layer is not that of the whole liquid crystal layer, but corresponds to the thickness of the liquid crystal layer in which the alignment of the liquid crystal particles is actually changed upon application of a voltage thereto. This is by reason of the fact that the liquid crystal particles in the neighborhood of the boundary of the liquid crystal layer fail to change the direction of alignment thereof even upon application of a voltage thereto due to the "anchoring" effect on the boundary surface. Let $d_{LC}$ be the thickness of the whole liquid crystal layer held by the substrates. Then, the relation $d_{\mathit{eff}} < d_{LC}$ always holds between the thickness $d_{LC}$ and $d_{\mathit{eff}}$. The difference between $d_{\mathit{eff}}$ and $d_{LC}$, depending on the liquid crystal material used for the liquid crystal panel, the type of the material of the boundary in contact with the liquid crystal layer such as the type of the alignment layer material, is estimated at about 20 nm to 40 nm.

As apparent from the equation above, the term $\sin^2\{2\alpha(E)\}$ is dependent on the field strength, and the brightness can be adjusted by changing the angle $\alpha$ in accordance with the field strength E. The normally black mode is achieved by setting the polarizing plate at $\alpha=0$ with no voltage applied, and therefore the sensitivity to the disruption of the initial direction of alignment increases.

As described above, the uniformity of alignment is a very important factor for the IPS system, and the rubbing method currently employed has come to pose a problem. Generally, the alignment processing by rubbing harbors many problems such as the breakage of the TFT due to the electrostatic electricity generated by the friction, the display defects due to the disrupted alignment caused by the irregular thread ends of the rubbing cloth, dust or the frequent replacement of the rubbing cloth. For the purpose of obviating these problems of the rubbing alignment process, what is called "the rubbing-less" alignment method has been studied in which the liquid crystal particles are aligned without rubbing, and has been proposed in various forms. The photo alignment method is one of the methods proposed, in which the polarized ultraviolet light is radiated on the surface of a high polymer film to align the liquid crystal particles without rubbing.

As an example, the method disclosed in "W. M. Gibbons et al., Nature, Vol. 351, pp 49-50 (1991)" has the feature in that the conventional rubbing process is not required, and the liquid crystal particles are aligned in a predetermined direction by radiation of polarized light. According to this optical alignment method, the problem of the scar on the film surface or the static electricity posed by the rubbing method is eliminated. Also, the fabrication process for industrial production is simpler. Thus, this method is closely watched as a new liquid crystal particle alignment method using no rubbing process.

The optical alignment method is roughly divided into the photo decomposition method and the photo reaction method. Both methods pose the following practical problems. Specifically, the material of the alignment layer requires some thickness to improve the hermeticity between the alignment layer material and the substrates. The provision of an alignment layer material having some thickness, however, makes it difficult to secure both light reactivity and transparency at the same time. In some cases, the coloring becomes so deep that the light utilization rate and the image quality are deteriorated.

In using the optical alignment method to a substrate in which the alignment layer has an underlying layer of a light-reflecting material, attention must be paid also to the path of the light reflected. The following subject is described in JP-A-2000-356776. The light radiated through the alignment layer for alignment process is reflected on a tapered surface of the electrode. This reflected light is reflected again on the lower substrate and enters the alignment layer again. Generally, the tapered surface of the electrode and the surface of the lower substrate are not always even. Therefore, the direction of polarization of the light radiated again on the alignment layer is different from the direction of polarization of the first light radiated on the alignment layer. In the case where the alignment layer material irradiated with the light polarized in other than predetermined direction develops the irregularities of alignment at the particular portion, thereby causing an alignment defect. To cope with this problem, JP-A-2000-356776 proposes the following configuration. Specifically, there is provided a liquid crystal display wherein a pair of transparent substrates are arranged in opposed relation to each other through a liquid crystal layer. An alignment layer subjected to the alignment process by radiation of polarized light is formed on the surface of at least one of the substrates. A plurality of metal electrodes are used to form an electric field in the liquid crystal layer formed on at least one of the transparent electrodes. Let a be the height of the step of the metal electrode, z the total distance of the side having a longer total step distance per pixel, $\theta$ the taper angle of the metal electrode, $\phi$ the angle of the incident light to the substrates, X the length of the side of one pixel along the row, Y the length of the side of one pixel along the column, and $\beta$ the numerical aperture per pixel. The relation holds that $a \times z/(\tan(\theta+\phi) \times X \times Y \times \beta) \geq 0.05$ or more. Thus, the ratio of which the strength of the incident light radiated on the alignment layer, reflected on the metal electrode and radiated again on the alignment layer represents the strength of the incident light is at least 0.1. The alignment layer is subjected to the alignment process by the radiated light in which the tilt angle $\phi$ of the direction of polarization from the direction associated a larger aspect ratio of the step of the metal electrode is not more than 10 degrees. This configuration can produce a liquid crystal display which develops no disruption of the alignment layer and in which the reduction in contrast is suppressed.

With regard to the problem of light reflection in the case where the optical alignment method is used for the substrate having a layer of a light-reflecting material under the alignment layer, JP-A-2000-356776 describes only a path in which the light reflected on the tapered portion of the electrode is reflected again on the lower substrate and radiated again on the alignment layer but fails to refer to a case in which the light reflected on the tapered portion of the electrode directly enters the alignment layer. In solving the problem according this invention, a consideration is given also to a case in which the light reflected from the tapered portion of the metal electrode formed immediately below the alignment layer is directly radiated again on the alignment layer. According to this invention, as compared with JP-A-2000-356776 disclosing the case in which the light is reflected both on the electrode and the lower substrate, the reflected light has less chance of being absorbed and scattered and thus probably has a larger effect on the alignment layer.

Assuming that the optical alignment method is used for a substrate formed with a stepped structure substantially of the same height as the thickness of the alignment layer by the electrode adjoining the alignment layer and the IPS-TFT-LCD is test produced by use of the particular substrate, light leaks from the edge portion of the electrode. This light leakage causes an increased black level, and the resultant reduction in image quality such as a lower contrast ratio and lack of brightness uniformity. It has been revealed that this image quality deterioration is partly caused by the light reflected from the tapered portion of the metal electrode immediately below the alignment layer as described above. In the case where the taper angle θ of the end portion of the electrode is not more than 45 degrees as shown in FIG. 2, the polarized light reflected on the tapered portion of the electrode is again radiated on the part of the alignment layer surface 132 parallel to the substrates, and an area is created where the both the polarized light is radiated both directly and after reflection. Even in the case where the taper angle of the end portion of the electrode is larger than 45 degrees as shown in FIG. 3, an area is also created where the polarized light is also radiated depending on the thickness of the electrode or the thickness of the alignment layer. In view of this, the present inventors have made vigorous research efforts on a mechanism in which the polarization axis of the polarized light directly radiated and that of the reflected light are displaced from each other, and have found a new mechanism not described in JP-A-2000-356776. JP-A-2000-356776 contains the description that the tapered surface of the metal electrode and the surface of the lower substrate reflecting the polarized light are not uniform and therefore the polarization axis is displaced when the light is reflected from these surfaces. The mechanism of displacement of the polarization axis as found by the present inventors is as follows. Specifically, the IPS system basically requires the initial alignment by displacing the liquid crystal particles from the direction of electrode extension by at least a predetermined angle, and therefore the polarization axis of the light radiated is normally tilted by a predetermined angle with respect to the electrode. In this way, the polarization axis of the radiated light is displaced from the direction perpendicular or parallel to the direction of the electrode extension. Therefore, the polarization axis of the light directly radiated on the flat surface 132 of the alignment layer is different from the polarization axis of the light radiated again after being reflected on the alignment layer surface 132. As a result, the alignment layer surface 132 comes to have the ability to align the liquid crystal particles along two axes, thereby causing the alignment defects of the liquid crystal particles. In the IPS system in which the alignment irregularities are liable to be more conspicuous than in other systems, the alignment defects brings about the problem of light leakage. Also, since the electrode is normally formed of a metal material having a high refractive index, the light reflectivity of the boundary between the alignment layer and the electrode increases. Therefore, a special care must be taken of the reflected light. This is the case with both the double reflection on the lower substrate and the light reflection from a part of the tapered portion of the metal electrode immediately below the alignment layer.

SUMMARY OF THE INVENTION

The object of this invention is to provide a liquid crystal display having a high image quality with an increased contrast ratio by reducing the display defect due to the double radiation of the polarized light on the alignment layer.

In order to achieve the object described above, according to one aspect of the invention, there is provided a liquid crystal display comprising a pair of substrates including at least one transparent substrate, a liquid crystal layer arranged between the substrates, a plurality of electrodes formed on at least one of the substrates to apply an electric field to the liquid crystal layer, a plurality of active elements connected to the electrodes, an alignment layer formed on each of the surfaces of the substrates in contact with the liquid crystal layer, and an optical means formed on at least one of the substrates to change the optical characteristics in accordance with the orientation of the particles of the liquid crystal layer, wherein the taper angle at the ends of the electrodes is larger than 45 degrees but less than 90 degrees, and wherein each alignment layer is formed of a material capable of obtaining the ability to control the orientation of the liquid crystal particles by the radiation of substantially linearly polarized light.

This invention is effective especially in the case where the taper angle at the ends of the electrodes formed in a layer near to the alignment layer is larger than 45 degrees but less than 90 degrees at which the reflected polarized light is not easily radiated on the surface of the alignment layer. In the case where the taper angle of the ends of the electrodes is 90 degrees or more, on the other hand, the tilt angle of the surface of the alignment layer coated on the taper portion of the electrodes partly reaches 90 degrees, and the particular part is not irradiated uniformly with the polarized light for the alignment process, thereby causing an alignment defect. Also, the taper angle of 90 degrees or more at the ends of the electrodes generates bubbles in the reversely tapered portion in the process of forming the alignment layer and causes the unevenness of the display unit. Therefore, it is not desirable to form the ends of the electrodes at an angle of 90 degrees or more.

According to this invention, in the case where the taper angle at the ends of the electrodes formed in the display area is larger than 45 degrees but less than 90 degrees, the reflected polarized light cannot be easily radiated on the alignment layer in the display area, thereby especially effectively contributing to an improved contrast ratio and an improved brightness uniformity.

This invention is applicable especially effectively to a high aperture pixel structure, in which a common electrode and/or a source electrode is formed on an organic insulating film and an alignment layer is formed on the organic insulating film and the electrodes. In the case where the organic insulating film is formed, most part of the reflected light from the lower part than the organic insulating film is absorbed into the organic insulating film, and therefore the invention is applicable especially effectively.

This invention also has the feature that, as shown in FIG. 9, the relation $y > x/2 \sin^2 \theta$ holds, where x is the thickness of each electrode, θ the taper angle and y the thickness of each alignment layer. This equation defines the electrode thickness x, the electrode taper angle θ and the alignment layer thickness y, so that the polarized ultraviolet light 130 for alignment reflected as light 131 from the electrode taper portion is prevented from being radiated again on the surface of the alignment layer 109.

In the conventional rubbing alignment method, the electrode step functions as a guide for the fiber of the rubbing cloth and the fiber is pulled in along the extension of the step or fails to reach the corners of the step, resulting in an alignment defect. Especially in the case where the source electrode, the common electrode or at least one of the common electrode wiring and the signal electrode is configured of a transparent electrode, the alignment in the neighborhood of the electrode step becomes conspicuous, and therefore the invention is effectively applicable. Also, this invention is especially effective in the case where the transparent electrode is formed of an ion-doped titanium oxide film or an ion-doped zinc oxide film (ZnO). Also, in the case where the source electrode and the corresponding common electrode are arranged in parallel to each other and form a zigzag structure, the alignment layer may not attach sufficiently closely to the underlying organic insulating film. The conventional alignment process by rubbing may lead to the display defect such as the separation of the alignment layer. The invention effectively suppresses such an inconvenience.

The invention is also effective especially in the case where the polarization axis of the polarized light is tilted somewhat from the direction of extension of the electrode for applying an electric field to the liquid crystal layer.

The size of the reflected light relative to the size of the light incident to a flat surface at the incidence angle of zero degree is expressed as $(1-P)/(1+P)$, where P is the ratio $(n1/n2)$ between the refractive indexes of two substances forming the boundary reflecting the light. The strength of light is expressed by the square of the formula described above. The nearer the ratio between the refractive indexes of two substances to unity, therefore, the lower the reflectivity and the strength of the reflected light. The alignment layer composed of organic particles and the organic insulating film have substantially the same refractive index. Thus, the reflectivity and the strength of the reflected light are considerably small in the boundary between the organic insulating film and the alignment layer, and therefore have substantially no effect.

Also, a thin alignment layer of 1 to 200 nm or in particular 1 to 100 nm is effective for impressing the liquid crystal layer with a voltage for driving the liquid crystal. Further, an excessively thick electrode increases the stepped structure of the TFT substrate surface, and the alignment layer cannot be uniformly coated on the taper surface of the electrode. The thickness of each electrode, therefore, is desirably in the range of 1 to 400 nm or in particular 1 to 200 nm.

Further, in order to achieve the object of the invention described above, according to a second aspect of the invention, there is provided a liquid crystal display comprising a pair of substrates including at least one transparent substrate, a liquid crystal layer arranged between the substrates, a plurality of electrodes formed on at least one of the substrates to apply an electric field to the liquid crystal layer, a plurality of active elements connected to the electrodes, an alignment layer formed on each of the surfaces of the substrates in contact with the liquid crystal layer, wherein the taper angle at the ends of the electrode formed in the layer nearest to each alignment layer and located in the display area is larger than 45 degrees but less than 90 degrees, and wherein the alignment layer is configured of a material capable of obtaining the ability to control the orientation of the liquid crystal particles by radiation of the substantially linearly polarized light.

As a configuration of the invention, the liquid crystal display according to the invention further comprises an optical means arranged on at least one of the substrates for changing the optical characteristics in accordance with the orientation of the particles of the liquid crystal layer.

As a configuration of the invention, the electrodes include a common electrode, a source electrode and an inorganic insulating film arranged between the common electrode and the source electrode.

As a configuration of the invention, at least one of the common electrode and the source electrode is formed in the shape of comb. In the substrate having comb-shaped electrodes, the closer the intervals between the comb teeth, the larger the electrode taper surface reflecting the light, resulting in a larger effect that the reflected light has on the surface of the alignment layer. This invention is effective in such a case.

As a configuration of the invention, the electric field applied by the electrodes to the liquid crystal layer is substantially parallel to the substrate surfaces.

As a configuration of the invention, the thickness of each alignment layer is not less than 50 nm.

By employing these configurations, the light reflected on the taper portion of the electrode, even if radiated directly on the alignment layer, is absorbed into the alignment layer and therefore the surface of the alignment layer is not substantially affected.

As a configuration of the invention, as shown in FIG. 10, the relation holds that $y > 100/(1-1/\cos 2\theta)$ where θ is the angle of the taper portion of the electrode and y the thickness of the alignment layer in nm. The equation defines the thickness y (nm) of the alignment layer and the taper angle θ of the electrode to prevent the light reflected on the taper portion of the electrode and reflected again on the underlying substance from having an effect on the surface of the alignment layer. The light having a wavelength enabling the alignment layer to control the orientation of the liquid crystal particles is absorbed into the very alignment layer. The light incident from the layer underlying the alignment layer by repeated reflection, therefore, can be substantially prevented from affecting the surface of the alignment layer by setting the alignment layer to the thickness of y (nm) or more as defined in the equation. In other words, as long as the requirements of this configuration are met, the light 132 reflected again in FIG. 10 causes substantially no alignment defect even if radiated again on the surface of the alignment layer 123.

According to the invention, in the case where the layer under the alignment layer is formed of an inorganic insulating film such as silicon nitride or silicon oxide, the difference in refractive index between the alignment layer mainly formed of organic particles and the inorganic insulating film increases the reflectivity at the boundary between the alignment layer and the inorganic insulating film. Thus, the light reflected on the boundary between the alignment layer and the inorganic insulating film has a strong effect on the surface of the alignment layer. The invention is effectively applicable to such a case.

As a configuration of the invention, the thickness of the alignment layer is larger than that of the electrode having the alignment layer on the surface thereof. Under this condition, the light reflected on the taper portion of the electrode cannot be easily radiated on the surface of the alignment layer, and therefore the invention is especially effectively applicable.

In the conventional rubbing alignment method, the electrode step functions as a guide for the fiber of the rubbing cloth and the fiber is pulled in along the extension of the step or fails to reach the corners of the step, resulting in an alignment defect. Especially in the case where the source electrode, the common electrode or at least one of the common electrode wiring and the signal electrode is configured of a transparent electrode, the alignment in the neighborhood of the electrode step becomes conspicuous and therefore the invention is effectively applicable. This invention is especially effective in the case where the transparent electrode is formed of an ion-doped titanium oxide film or an ion-doped zinc oxide film (ZnO). Also, in the case where the electrode such as the source electrode or the common electrode having the alignment layer formed on the surface thereof makes up a zigzag structure, the alignment layer may not attach sufficiently closely to the underlying insulating film. The conventional rubbing alignment process, therefore, may cause the display defect such as the separation of the alignment layer. The invention is effectively applicable to such a case.

In the case where the polarization axis of the polarized light is tilted by a predetermined angle with respect to the direction of extension of the electrode for applying an electric field to the liquid crystal layer, the polarization axis of the reflected light radiated again on the surface of the alignment layer is displaced from the direction of polarization of the light directly radiated, and therefore the effect of the reflected light is increased. In such a case, the invention is especially effectively applicable.

In the case where the common electrode, the source electrode or at least one of the common electrode wiring and the signal electrode is formed of Al, Cr, Mo, Ta or W or an alloy containing at least one of these elements, the reflectivity is increased, and therefore the invention is applicable especially effectively.

This invention has the feature that the direction of orientation of the liquid crystal particles is substantially the same in the two boundaries between the liquid crystal layer and the alignment layers formed on a pair of the substrates. In the case where this liquid crystal display is in normally black mode, the disruption of the initial alignment of the liquid crystal particles is conspicuous and therefore the invention is effective.

Another feature of the invention lies in that the long axis of the liquid crystal particles making up the liquid crystal layer on each alignment layer is parallel or orthogonal to the polarization axis of the substantially linearly polarized light giving the alignment layer the ability to control the particles of liquid crystal layer.

Still another feature of the invention is that the wavelength of the substantially linearly polarized light radiated on each alignment layer is in the range of 200 nm to 400 nm. The alignment layer used with the liquid crystal display transmits the light of the wavelength in the visible area. Therefore, the light of the wavelength in the visible area is not easily used as the light giving the alignment layer the ability to control the orientation of the particles of the liquid crystal layer. Also, the light having the wavelength of 200 nm to 400 nm, as compared with the light having the wavelength in the visible area, is easily absorbed, after being reflected, by the members under the alignment layer, and therefore the invention is effectively applicable.

Also, reducing the thickness of the alignment layer to the order of 1 to 200 nm or 1 to 100 nm is effective for applying a voltage to the liquid crystal layer for driving the liquid crystal particles. An excessively thick electrode, on the other hand, would make a bulky stepped structure of the TFT substrate surface and makes it impossible to coat the alignment layer uniformly over the taper surface of the electrode. The thickness of the electrode, therefore, is desirably in the range of 1 to 400 nm or specifically 1 to 200 nm.

According to this invention, the effects of the reflected light are eliminated in the alignment processing by light radiation. Especially, in the liquid crystal display of IPS type, the problem of a small production margin of the alignment processing unique to the IPS-TFT-LCD is obviated. Thus, the occurrence of the display defect due to variations in the direction of initial alignment is reduced and thus a large-sized liquid crystal display having a high image quality with an improved contrast ratio is provided.

Other objects, features and advantages of the invention will become apparent from the following description of the embodiments of the invention taken in conjunction with the accompanying drawings.

DETAILED DESCRIPTION OF THE INVENTION

Embodiments of the invention are explained in detail with reference to the drawings. In the description that follows, the substrate formed with active elements such as a thin-film transistor is referred to as the active matrix substrate. Also, an opposite substrate having a color filter is sometimes referred to as a color filter substrate.

Figure 1:
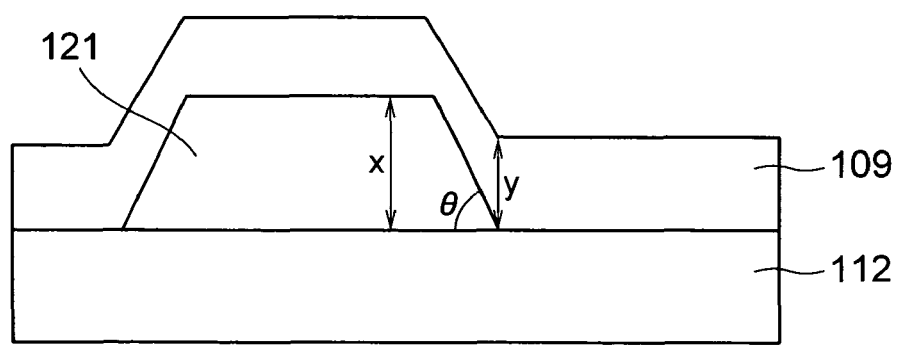
FIG. 1 is an enlarged view of the portion defined by circles in FIGS. 4, 6 and 8.
Figure 2:
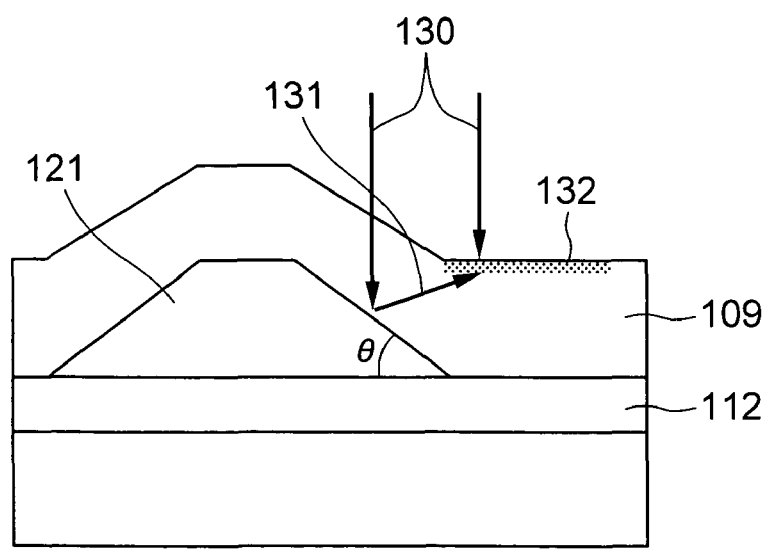
FIG. 2 is a diagram showing a case in which the polarized ultraviolet light reflected on the taper portion of the electrode is radiated on the surface of the alignment layer.
Figure 3:
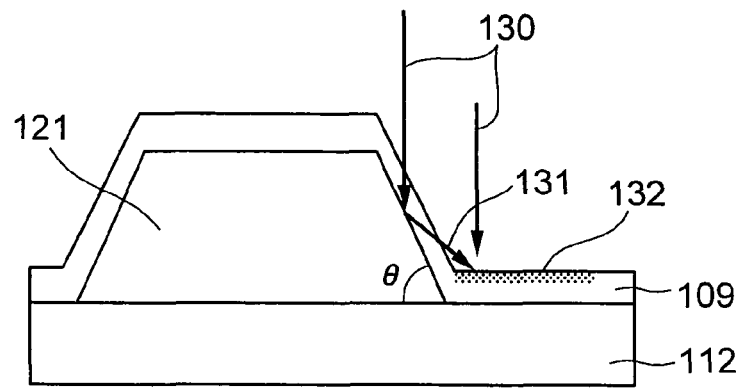
FIG. 3 shows a case in which the ultraviolet light reflected on the taper portion of the electrode is radiated on the surface of the alignment layer through a different route than in FIG. 2.
Figure 4:
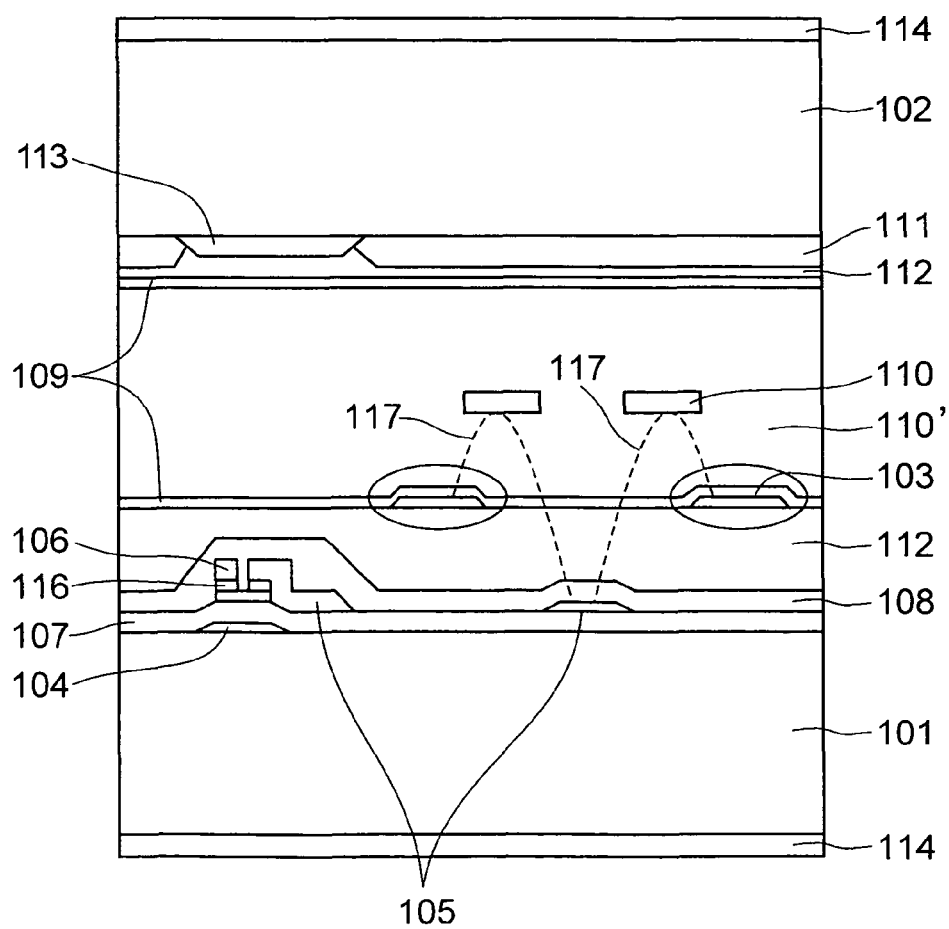
FIG. 4 is a sectional view of a pixel for explaining a pixel configuration of a liquid crystal display according to a first embodiment of the invention.
Figure 5A:
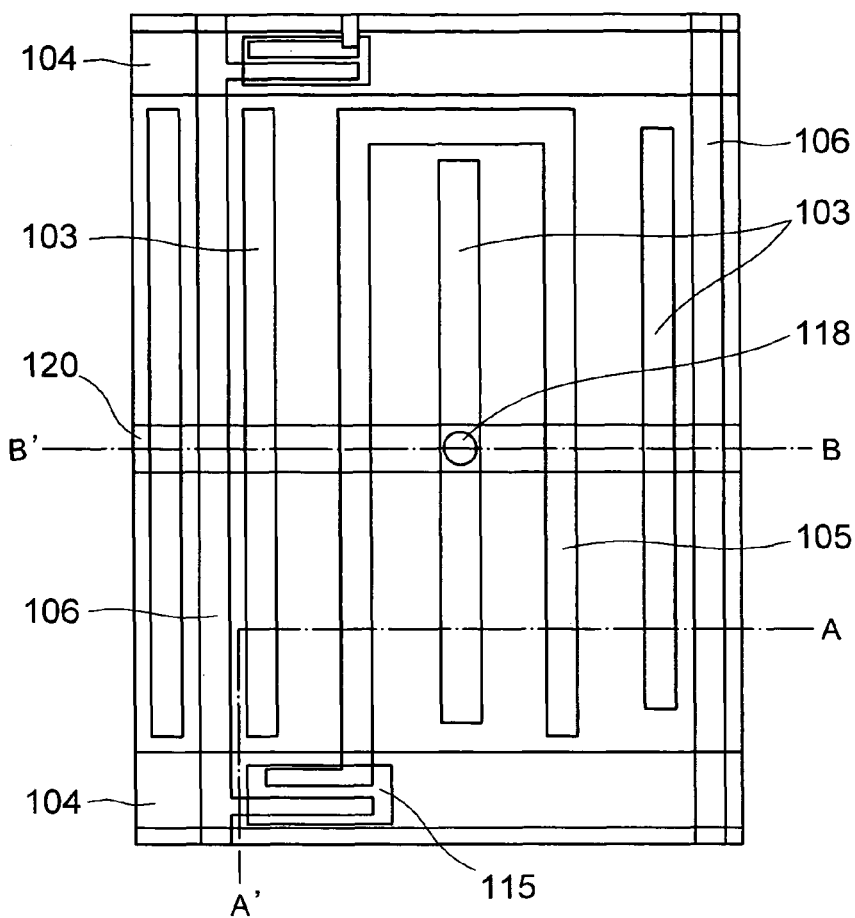
FIGS. 5A, 5B, 5C are a plan view and sectional views of the pixel for explaining a pixel configuration of a liquid crystal display according to a first embodiment of the invention.
Figure 5B:
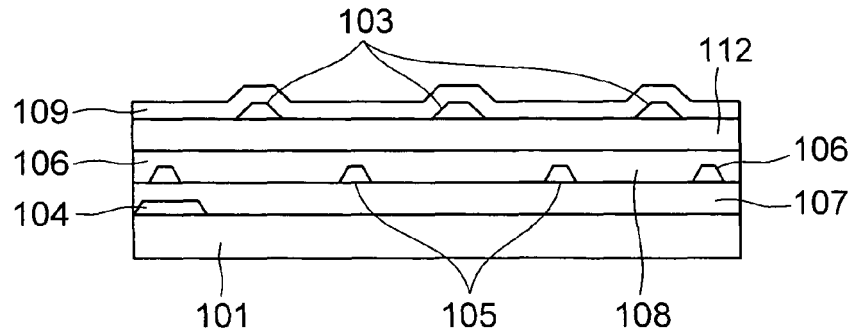
Figure 5C:
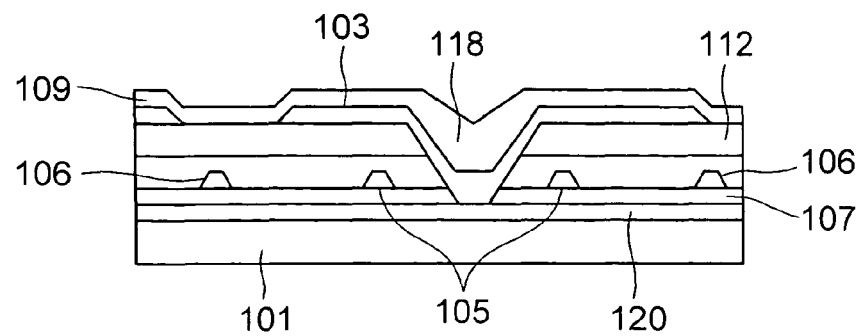

FIG. 4 is a model sectional view for explaining a pixel and the related parts of a liquid crystal display according to a first embodiment of the invention. FIGS. 5A, 5B, 5C are schematic diagrams showing an active matrix substrate for explaining the configuration of a pixel and the related parts of a liquid crystal display according to the first embodiment of the invention. Specifically, FIG. 5A is a plan view, FIG. 5B a sectional view taken in line A-A' in FIG. 5A, and FIG. 5C a sectional view taken in line B-B' in FIG. 5A. FIG. 4 shows a part of the sectional view taken in line A-A' in FIG. 5A. The sectional views of FIGS. 5B and 5A schematically show the configuration of the essential parts in exaggerated fashion, and fail to represent the one-to-one correspondence with the sectional views taken in lines A-A' and B-B' in FIG. 5A. In FIG. 5B, for example, a semiconductor layer 116 is not shown.

In the liquid crystal display according to this embodiment, a gate electrode (scanning electrode) 104 of Cr (chromium) and a common wiring (common electrode wiring) 120 are arranged on a glass substrate 101 making up an active matrix substrate. A gate insulating film 107 of silicon nitride is formed in such a manner as to cover the gate electrode 104 and the common electrode wiring 120. Also, a semiconductor layer 116 of amorphous silicon or polysilicon is arranged on the gate electrode 104 through the gate insulating film 107 and adapted to function as an active element constituting an active layer of the thin-film transistor (TFT). Also, drain electrodes (video signal wiring) 106 and source electrodes (pixel electrodes) 105 of Cr.Mo (chrome molybdenum) are arranged in superposition on a part of the semiconductor film 116. A protective insulating film 108 of silicon nitride is formed in such a manner as to cover all the component parts described above.

As schematically shown in FIG. 5C, common electrodes 103 connecting to the common electrode wiring 120 via a through hole 118 formed through the gate insulating film 107 and the protective insulating film 108 are arranged on an organic insulating film 112. Also, as understood from FIG. 5A, common electrodes 103 pulled out of the common electrode wiring 120 via the through hole 118 are formed in opposed relation to the source electrodes 105 in the one-pixel area in plan view.

According to the first embodiment of the invention, therefore, the source electrodes 105 are arranged in the layer lower than the protective insulating layer 108 under the organic insulating film 112, and the common electrodes 103 are arranged on the organic insulating film 112. One pixel is configured in an area defined by a plurality of electrodes including the source electrodes 105 and the common electrodes 103. Also, an alignment layer 109 is formed on the surface of the active matrix substrate with unit pixels arranged in matrix, i.e. the organic insulating film 112 formed with the common electrodes 103.

As shown in FIG. 4, on the other hand, a color filter 111 is arranged on the glass substrate 102 making up the opposite substrate, for each pixel separated by shield films (black matrix) 113. Also, each color filter 111 and each shield film 113 are covered with an organic insulating film 112 of a transparent insulating material. Further, the alignment layer 109 is formed also on the organic insulating film 112 thereby to make up a color filter substrate.

These alignment layers 109 have a high-pressure mercury lamp as a light source and the ability to align the liquid crystal particles by the radiation of the linear polarized ultraviolet light derived from a polarizer which is a pile-of-quartz plates.

Each alignment layer 109 is fabricated by coating a varnish-like solution on the substrate and then removing the solvent in the baking process. In the case where the alignment layer is too thick, however, the varnish solvent cannot be sufficiently removed and remains in the film undesirably. This residual solvent is fused into the liquid crystal layer and causes a display defect. It is therefore necessary to take the thickness of the alignment layer also into consideration.

The glass substrate 101 making up the active matrix substrate and the glass substrate 102 making up the opposite electrode are arranged with the surfaces of the alignment layers 109 thereof in opposed relation to each other. A liquid crystal layer (liquid crystal substance layer) 110' configured of the liquid crystal particles 110 is arranged between the glass substrate 101 and the glass substrate 102. Also, a polarizing plate 114 is formed on each of the outer surfaces of the glass substrate 101 making up the active matrix substrate 101 and the glass substrate 102 making up and the opposite electrode.

As described above, a liquid crystal display of active matrix type using a thin film transistor (i.e. a TFT liquid crystal display) is configured. In this TFT liquid crystal display, the liquid crystal particles 110 making up the liquid crystal substance layer 110', when no electric field is applied to them, are arranged substantially in parallel to the opposite surfaces of glass substrates 101, 102, and homogeneously oriented in the initial direction of alignment defined by the optical alignment process. Assume that the thin-film transistor (TFT) is turned on by applying a voltage to the gate electrode 104. Due to the potential difference between the source electrode 105 and the common electrode 103, an electric field 117 is applied to the liquid crystal substance layer 110'. The liquid crystal particles 110 making up the liquid crystal substance layer change their direction along the electric field due to the interaction between the anisotropic dielectric constant of the liquid crystal substance and the electric field. In the process, the anisotropic index of refraction of the liquid crystal substance layer and the operation of the polarizing plates 114 combine to change the light transmittance of the liquid crystal display for display operation.

The organic insulating film 112 is made of acryl resin or epoxy acryl resin having high insulation and transparency characteristics or a thermosetting resin such as polyimide resin. The organic insulating film 112 may alternatively be made of a photo-cured transparent resin or an inorganic material such as polysiloxane resin. Further, the organic insulating film 112 may double as an alignment layer 109.

Figure 6:
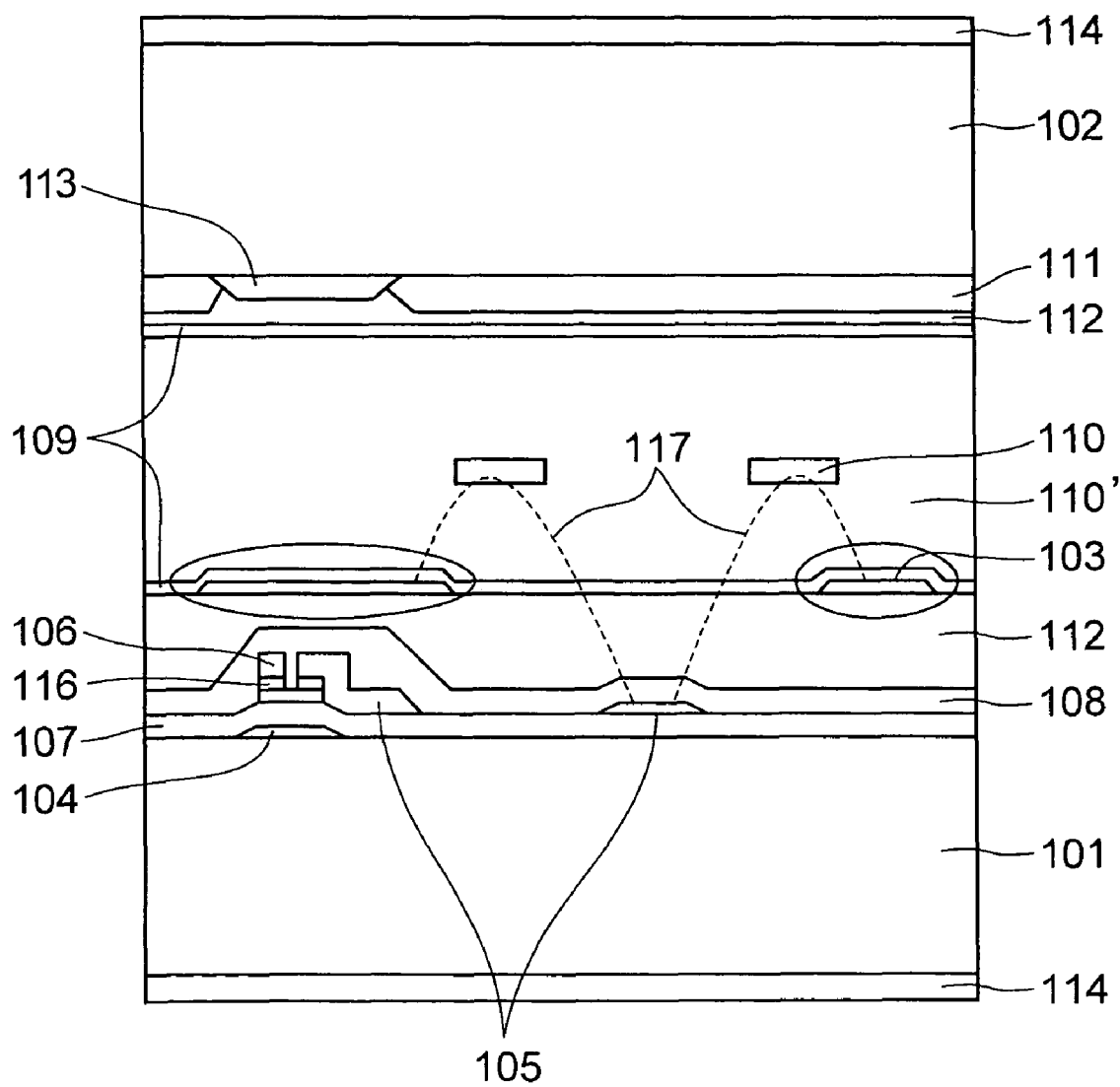
FIG. 6 is a sectional view of the pixel for explaining a pixel configuration of a liquid crystal display according to a second embodiment of the invention.
Figure 7A:
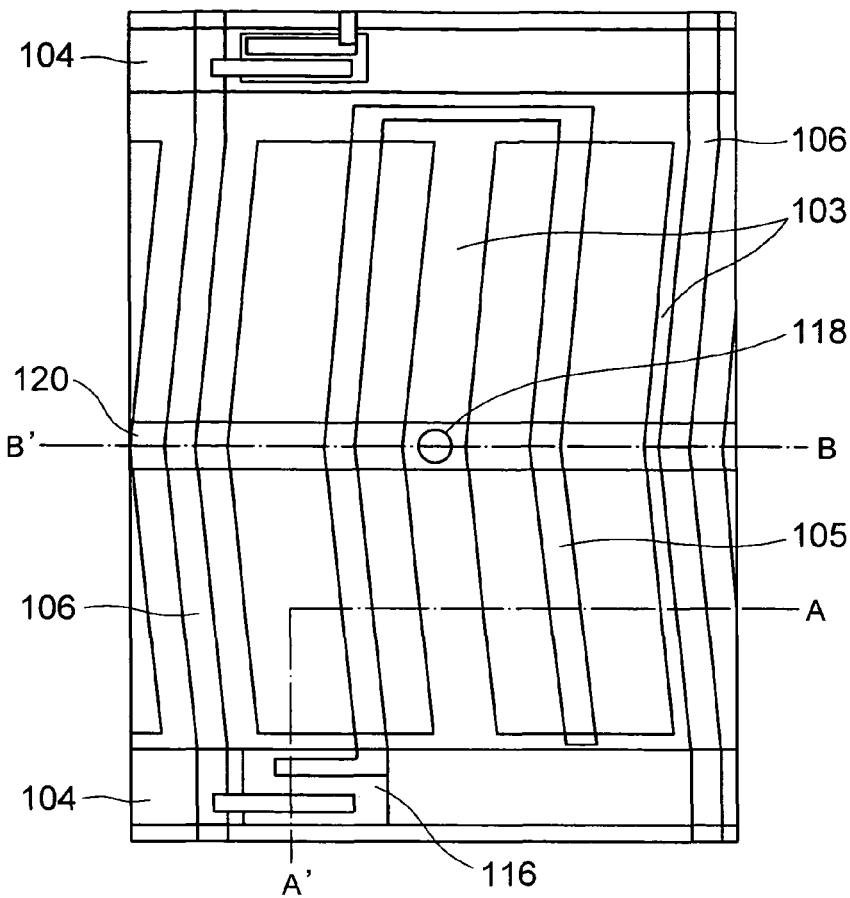
FIGS. 7A, 7B, 7C are a plan view and sectional views of the pixel for explaining a pixel configuration of a liquid crystal display according to the second embodiment of the invention.
Figure 7B:
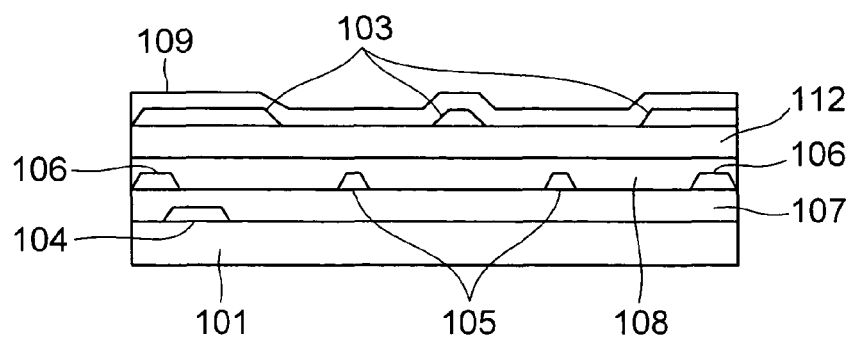
Figure 7C:
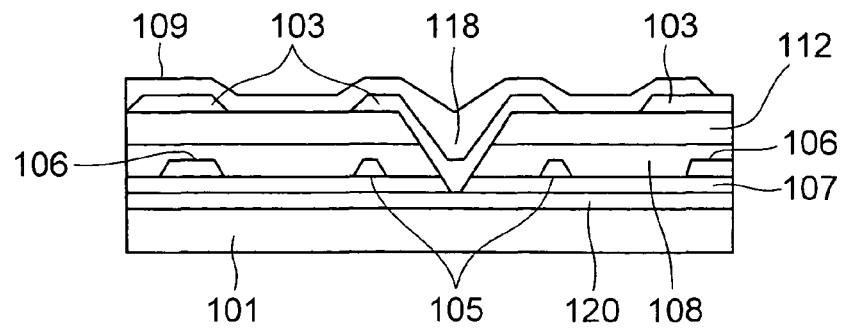

Next, a liquid crystal display according to a second embodiment of the invention is explained. FIG. 6 is a sectional view schematically showing a pixel and the neighborhood thereof for explaining the liquid crystal display according to the second embodiment of the invention. FIGS. 7A, 7B, 7C schematically show an active matrix substrate for explaining the configuration of a pixel and the neighborhood thereof of the liquid crystal display according to the second embodiment of the invention. More specifically, FIG. 7A is a plan view, FIG. 7B a sectional view taken in line A-A' in FIG. 7A, and FIG. 7C a sectional view taken in line B-B' in FIG. 7A. FIG. 6 shows a part of the cross section taken along line A-A' in FIG. 7A. FIGS. 7B and 7C are sectional views schematically showing the configuration of the essential parts in exaggerated fashion, and have no one-to-one correspondence with the views taken in lines A-A' and B-B'. The semiconductor film 116, for example, is not shown in FIG. 7B.

In the liquid crystal display according to the second embodiment of the invention, a gate electrode 104 of Cr and a common electrode wiring 120 are arranged on a glass substrate 101 making up an active matrix substrate, and a gate insulating film 107 of silicon nitride is formed in such a manner as to cover the gate electrode 104 and the common electrode wiring 120. Also, a semiconductor film 116 of amorphous silicon or polysilicon is arranged on the gate electrode 104 through the gate insulating film 107 thereby to function as an active layer of the thin-film transistor (TFT) making up an active element.

Drain electrodes 106 and source electrodes (pixel electrodes) 105 of chrome molybdenum are arranged in superposition on a part of the semiconductor film 116. A protective insulating film 108 of silicon nitride is formed in such a manner as to cover the whole of the drain electrodes 106 and the source electrodes 105. An organic insulating film 112 is arranged on the protective insulating film 108. The organic insulating film 112 is formed of a transparent material such as acryl resin. Each source electrode 105 is configured of a transparent material such as ITO ($In_2O_3$:Sn). Each common electrode 103 is connected to the common electrode wiring 120 via a through hole 118 formed through the gate insulating film 107, the protective insulating film 108 and the organic insulating film 112.

Each common electrode 103 paired with a corresponding source electrode 105 for applying an electric field to excite the liquid crystal is formed in such a manner as to surround an area of an individual pixel in plan view. Also, the common electrodes 103 are arranged on the organic insulating film 112. The common electrodes 103 are arranged in such a manner as to cover, as viewed from above, the drain electrodes 106, the scanning electrode 104 and the thin-film transistor (TFT) making up an active element constituting underlying layers. Thus, the common electrodes 103 each double as a light shield layer for shielding the semiconductor film 116.

An alignment layer 109 is formed on the surface of the glass substrate 101 making up an active matrix substrate composed of a matrix of unit pixels (individual pixels) configured as described above, i.e. on the organic insulating film 112 and the common electrodes 103 formed thereon. An organic insulating film 112 and an alignment layer 109, on the other hand, are formed on a color filter 111 which in turn is formed on the glass substrate 102 making up the opposite substrate.

As in the first embodiment, the alignment layers 109 are equipped with the ability to align the liquid crystal particles by radiation of the linearly polarized ultraviolet light derived from a pile-of-plates polarizer composed of a stack of quartz plates with a high-pressure mercury lamp as a light source.

The glass substrate 101 and the glass substrate 102 are arranged with the respective alignment layers 109 in opposed relation to each other. A liquid crystal substance layer 110' configured of liquid crystal particles 110 is arranged between the glass substrates 101, 102. A polarizing plate 114 is formed on each outer surface of the glass substrate 101 and the glass substrate 102 in opposed relation to the glass substrate 101.

As described above, also in the second embodiment of the invention, like in the first embodiment described above, the source electrodes 105 are arranged under the organic insulating film 112 and the protective insulating film 108, and the common electrodes 103 are arranged on the source electrodes 105 and the organic insulating film 112. In the case where the electric resistance of the common electrodes 103 is sufficiently low, the common electrodes 103 can double as the common electrode wiring 120 formed in the lowest layer. In that case, the need of the common electrode wiring 120 arranged in the lowest layer and the corresponding through hole is eliminated.

According to the second embodiment, as shown in FIG. 7A, each individual pixel is configured in an area defined by the common electrodes 103 formed in grid, and in collaboration with the source electrodes 105, divided into four areas. The source electrodes 105 and the common electrodes 103 in opposed relation to the source electrodes 105 are arranged in parallel to each other as a zigzag structure. Each individual pixel thus forms a plurality of subsidiary pixels. This structure offsets the tone change in a plane.

Figure 8:
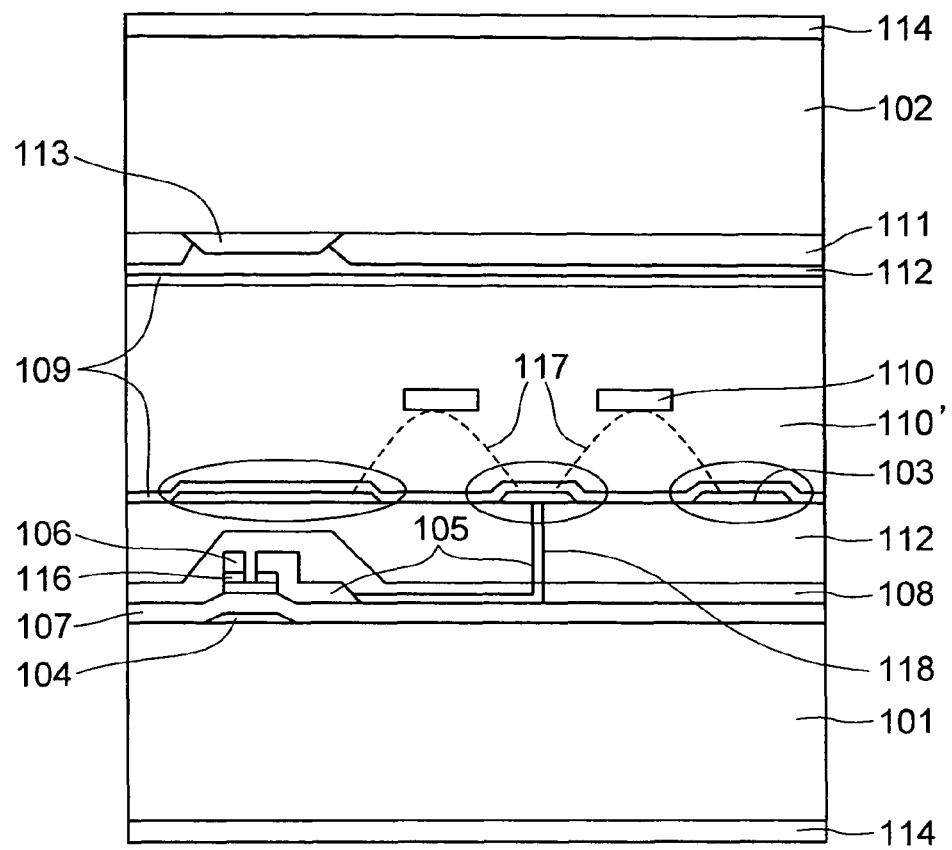
FIG. 8 is a sectional view of the pixel configuration of a liquid crystal display for explaining an embodiment of the invention.

FIG. 8 is a sectional view schematically showing an individual pixel and the neighborhood thereof for explaining the liquid crystal display according to a third embodiment of the invention. In FIG. 8, the same reference numerals as those in the drawings of each embodiment described above designate the same functions, respectively. As shown in FIG. 8, according to this embodiment, the source electrodes 105 arranged under the protective insulating film 108 are raised above the organic insulating film 112 via a through hole 118 and arranged in the same layer as the common electrodes 103. This configuration can further reduce the voltage for driving the liquid crystal.

In the TFT liquid crystal display configured as described above, as long as no electric field is applied, the liquid crystal particles 110 making up the liquid crystal substance layer 110' remain substantially parallel to the surfaces of the glass substrates 101, 102 arranged in opposed relation to each other and thus homogeneously oriented in the direction of initial orientation defined by the optical alignment process. Assume that the thin-film transistor (TFT) is turned by applying a voltage to the gate electrode 104. The electric field 117 is applied to the liquid crystal substance layer 110' due to the potential difference between the source electrodes 105 and the common electrodes 103, and the direction of the electric field of the liquid crystal particles 110 is changed by the collaboration between the electric field and the anisotropic dielectric constant of the liquid crystal substance. In the process, the operation of the polarizing plate 114 and the anisotropic index of refraction of the liquid crystal substance layer 110' combine to change the light transmittance of the liquid crystal display to perform the display operation.

In each of the embodiments of the invention described above, a plurality of display areas each including the common electrodes and the source electrodes of an individual pixel can be formed. In the case where a plurality of display areas are formed in this way, the voltage applied to drive the liquid crystal can be reduced by shortening the distance between the source electrodes and the common electrodes even in the case where each individual pixel is large.

In each of the embodiments of the invention described above, the material of the transparent conductive film making up at least one of the source electrode and the common electrode, though not specifically limited, is desirably indium-tin-oxide (ITO) or the like ion-doped titanium oxide or ion-doped zinc oxide.

Generally, in the IPS system, unlike in the longitudinal field system or typically the conventional TN system, the boundary with the substrate surface is not basically required to be tilted, and the visual field angle characteristic is known to be better, the smaller the boundary tilt angle. The small boundary tilt angle is desirable also for the optical alignment layer and especially effective at one degree or less.

Next, specific examples of the method of fabricating a liquid crystal display according to the invention are explained.

First Specific Example

The first specific example corresponds to the liquid crystal display according to the first embodiment of the invention described above. The first specific example of the invention is explained in detail with reference to FIGS. 4 and 5A, 5B, 5C.

A liquid crystal display according to the first specific example of the invention is fabricated in the manner described below. Specifically, a glass substrate having a polished surface as thick as 0.7 mm is used as a glass substrate 101 making up an active matrix glass substrate and a glass substrate 102 making up an opposite substrate (color filter substrate). A thin-film transistor 115 formed on the glass substrate 101 includes source electrodes 105, signal electrodes 106, a scanning electrode 104 and a semiconductor film 116. The scanning electrode 104, the common electrode wiring 120, the signal electrodes 106 and the source electrodes 105 are all formed by patterning a chromium film. The interval between a source electrode 105 and a corresponding common electrode 103 is set to 7 µm. The taper angle at the ends of each of these electrodes is set to not less than 45 degrees but less than 90 degrees by adjusting the etching time. The common electrodes 103 and the source electrodes 105 are formed of a chromium film low in resistance and easy to pattern. Nevertheless, a transparent electrode may be configured using an ITO film to achieve a higher brightness characteristic. The gate insulating film 107 and the protective insulating film 108 are formed of silicon nitride and have a thickness of 0.3 µm. Acryl resin is coated on the films 107, 108 and heat treated for one hour at 220° C. Thus, a transparent, insulative organic insulating film 112 having a thickness of 3.0 µm is formed.

Next, as shown in FIG. 5C, a through hole reaching the common electrode wiring 120 is formed by photolithography and etching. The common electrodes 103 connected to the common electrode wiring 120 are formed by patterning. In the process of forming the common electrodes 103 each having an alignment layer on the surface thereof, an electrode thin film as thick as about 70 nm is formed and six active matrix substrates are fabricated under various etching conditions.

As a result, as shown in FIG. 5A, the source electrodes 105 are arranged between the three common electrodes 103 within a unit pixel (individual pixel). Thus, six active matrix substrates are formed of 1024×3 (corresponding to R, G, B) signal electrodes 196 and 768 scanning electrodes 104 for a total of 1024×3×768 pixels.

Next, each alignment layer is fabricated in the manner described below. Specifically, 4,4'-diamino azobenzene shown in formula [1] and 4,4'-diamino benzophenone shown in formula [2] are mixed with each other at the molar ratio of 6 to 4 thereby to obtain diamine. Also, pyromellitic acid anhydride shown in formula [3] and 1,2,3,4-cyclobutane tetra carbonic acid dianhydride shown in formula [4] are mixed with each other at the molar ratio of 1 to 1 thereby to obtain an anhydride. The polyamic varnish consisting of the diamine and the anhydride thus obtained is adjusted to the resin concentration of 5 wt %, NMP of 40 wt %, γ-butyl lactone of 40 wt % and butyl cellosolve of 15 wt %, and formed by printing on the active matrix substrate. After heat treatment for 30 minutes at 220° C., an alignment layer 109 of fine polyimide having a thickness of about 100 nm is formed.

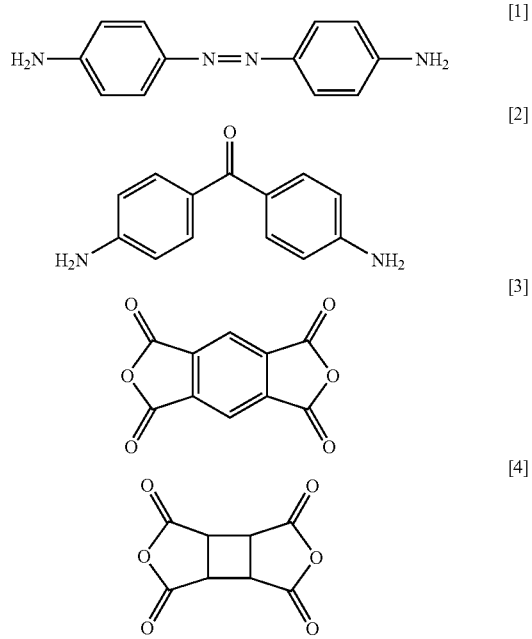

In similar fashion, a columnar spacer of resin was formed by photolithography and etching on the surface of the opposite glass substrate 102 having the color filter. Like the active matrix substrate, the surface of the columnar spacer was printed with polyamic varnish and heat treated for 30 minutes at 220° C. In this way, an alignment layer 109 of fine polyimide about 100 nm thick was formed. In order to give the surface thereof the ability to align the liquid crystal particles, the polarized ultraviolet (UV) light was radiated on the polyimide alignment layer 109 in the direction substantially perpendicular to the substrate. Using a high-pressure mercury lamp as a light source, the UV light in the range of 200 nm to 400 nm in wavelength was obtained through an interference filter, and linearly polarized at the polarization ratio of about 10 to 1 using the pile-of-plates polarizer composed of a stack of quartz plates. This polarized light was radiated at the radiation energy of about 7 J/cm². As a result, the direction of alignment of the liquid crystal particles on the surface of the alignment layer was found to be at right angles to the direction of polarization of the polarized UV light radiated.

Next, these two glass substrates 101, 102 were placed while the surfaces thereof having the alignment layer 109 capable of aligning the liquid crystal particles were arranged in opposed relation to each other. The sealing agent was coated on the peripheral portion of each glass substrate. Thus, a liquid crystal display panel (also called the cell) making up a liquid crystal display was assembled. The liquid crystal particles were aligned by the two glass substrates in substantially parallel to each other at an angle of 75° to the direction in which the electric field was applied. A nematic liquid crystal substance A having a positive anisotropic dielectric constant $\Delta\epsilon$ of 10.2 (1 kHz, 20° C.), an anisotropic index of refraction $\Delta n$ of 0.075 (wavelength 590 nm, 20° C.), a torsional modulus of elasticity K2 of 7.0 pN and a nematic isotropic phase transition temperature T(N–I) of about 76° C. was injected into the cell in vacuum and sealed with a sealant of ultraviolet photo-cured resin. In this way, a liquid crystal panel with the liquid crystal layer having the thickness (gap) of 4.2 µm was fabricated.

The retardation Δnd of this liquid crystal panel was about 0.31 μm. Also, using an alignment layer and a liquid crystal substance equivalent to those of this panel, a liquid crystal display panel with homogeneously aligned liquid crystal particles was fabricated. The pretilt angle of the liquid crystal was measured by the crystal rotation method, and the figure of about 0.2 degrees was obtained. This liquid crystal display panel was held by two polarizing plates 114, and arranged with the polarization transmission axis of one polarizing plate substantially parallel to the direction of alignment of the liquid crystal particles and the polarization transmission axis of the other polarizing plate at right angles thereto. After that, a drive circuit and a backlight were connected to make a module. In this way, a liquid crystal display of active matrix type was obtained. The liquid crystal display according to this specific example has a normally black characteristic with dark display at low voltage and bright display at high voltage.

The display quality of these six liquid crystal displays was evaluated, and it was confirmed that these liquid crystal displays are of two categories. In one category, the contrast ratio was 410 or more over the whole surface and the display uniformity was high. In the other category, the contrast ratio is less than 232, light leaks at the electrode edges and the display quality is low. With regard to these liquid crystal displays, the observation of the cross section under SEM and the measurement taken of the taper angle at the ends of each common electrode 103 having an alignment layer on the surface thereof showed that the taper angles are 48, 51 and 64 degrees and light leaks for the liquid crystal displays of the first category, while the taper angles were 35, 38 and 42 degrees for the liquid crystal displays of the second category. Table 1 shows the result of evaluation of the taper angle of the common electrode 103 and the contrast ratio.

TABLE 1

Taper angle and contrast ratio evaluation

| | Taper angle (degrees) | | | | | |
|---|---|---|---|---|---|---|
| | 64 | 51 | 48 | 42 | 38 | 35 |
| Contrast ratio | 433 | 423 | 412 | 232 | 206 | 188 |

The evaluation shows that the smaller the taper angle at the ends of each common electrode 103, the larger the area where light leaks for the worse display uniformity. The electrode thickness x, the electrode taper angle θ and the alignment layer thickness y were measured at positions shown in FIG. 9 based on the cross-sectional transmission electron micrograph.

Second Specific Example

According to the second specific example, in forming the scanning electrode 104, the common electrode wiring 120, the signal electrode 106 and the source electrodes 105 under the organic insulating film 112, the the taper angle at the ends of these electrodes was set to less than 45 degrees by adjusting the etching conditions. With the other points set similar way to the corresponding points of the first specific example, six IPS-TFT-LCDs were test produced. The thickness of each common electrode 103 is about 50 nm, and that of the alignment layers formed on the two substrates about 80 nm.

The display quality of these six liquid crystal displays was evaluated, and it was confirmed that these liquid crystal displays are of two categories. In one category, the contrast ratio was 400 or more over the whole surface and the display uniformity was high. In the other category, the contrast ratio is less than 240, light leaks at the electrode edges and the display uniformity is low. With regard to these liquid crystal displays, the observation of the cross section under SEM and the measurement taken of the taper angle at the ends of each common electrode 103 having an alignment layer on the surface thereof showed that the taper angles are 47, 56 and 68 degrees and light leaks for the liquid crystal displays of the first category, while the taper angles are 34, 40 and 43 degrees for the liquid crystal displays of the second category. Table 2 shows the result of evaluation of the taper angle of the common electrodes 103 and the contrast ratio.

TABLE 2

Taper angle and contrast ratio evaluation

| | Taper angle (degrees) | | | | | |
|---|---|---|---|---|---|---|
| | 68 | 56 | 47 | 43 | 40 | 34 |
| Contrast ratio | 422 | 418 | 403 | 237 | 224 | 208 |

It was confirmed that the smaller the taper angle of the ends of the common electrode 103, the larger the area where light leaks for a worse display uniformity.

As compared with the result of the first specific example in which the taper angle of the electrodes under the organic insulating film 3.0 μm thick is set to larger than 45 degrees but less than 90 degrees, the contrast in the second specific example is not greatly different. The light reflected from the layers under the organic insulating film, therefore, is absorbed into the organic insulating film. It became apparent therefore that the display quality is not greatly affected. The electrode film thickness x, the electrode taper angle θ and the alignment layer thickness y were measured at positions shown in FIG. 9 based on the cross-sectional transmission electron micrograph.

Third Specific Example

According to the third specific example, like in the first specific example, six IPS-TFT-LCD were test produced. The thickness of the common electrode 103 was about 100 nm, and the thickness of the alignment layers 109 formed on the upper and lower substrates was 85 nm.

Next, the display quality of the six liquid crystal displays was evaluated, and it was confirmed that these liquid crystal displays are of two categories. In one category, the contrast ratio was 410 or more over the whole surface and the display uniformity was high. In the other category, the contrast ratio is less than 245, light leaks at the electrode edges and the display uniformity is low. With regard to these liquid crystal displays, the observation of the cross section under SEM and the measurement taken of the taper angle at the ends of the common electrode 103 having an alignment layer on the surface thereof showed that the display uniformity is satisfactory for the liquid crystal displays which satisfy the equation $y > x/2 \sin^2 \theta$ and have the taper angles of 53, 61 and 69 degrees, while the other liquid crystal displays having the taper angles of 37, 41 and 49 cause light leakage and have a low display uniformity. Table 3 shows the result of evaluation of the taper angle of the common electrode 103 and the contrast ratio.

TABLE 3

Taper angle and contrast ratio evaluation

| | Taper angle (degrees) | | | | | |
|---|---|---|---|---|---|---|
| | 69 | 61 | 53 | 49 | 41 | 37 |
| Contrast ratio | 431 | 427 | 414 | 234 | 219 | 192 |

It was confirmed that the lower the taper angle at the ends of the common electrode 103, the larger the area where light leaks for a worse display uniformity. The electrode thickness x, the electrode taper angle θ and the alignment layer thickness y were measured at positions shown in FIG. 9 based on the cross-sectional transmission electron micrograph.

Fourth Specific Example

A fourth specific example of the configuration of the liquid crystal display according to the fourth embodiment of the invention is explained with reference to FIGS. 6 and 7. In fabricating a liquid crystal display according to the second specific example of the invention, a glass substrate 0.7 mm thick with a polished surface was used as glass substrates 101, 102. The thin-film transistor 115 is configured of a source electrode 105, a signal electrode 106, a scanning electrode 104 and a semiconductor film 116. The scanning electrode 104 is formed by patterning an aluminum film, the common electrode 120 and the signal electrode 106 by patterning a chromium film, and the source electrode 105 by patterning an ITO film. As shown in FIG. 7A, the electrodes other than the scanning electrode 104 were formed into a zigzag electrode wiring pattern. The angle of the bend of the zigzag was set to 10 degrees. The gate insulating film 107 and the protective insulating film 108 are composed of silicon nitride and have the thickness of 0.3 μm.

Then, as shown in FIG. 7C, a cylindrical through hole about 10 μm in diameter reaching the common electrode wiring 120 was formed by photolithography and etching. The portion around the through hole thus formed was coated with acryl resin, and heat treated for one hour at 220° C. into a transparent organic insulating film 112 having a dielectric constant of about 4 F/m and a thickness of about 3 μm. This organic insulating film 112 flattened the unevenness due to the steps of the source electrode 105 in the display area and the steps at the boundary portion of the color filter 111 between adjoining pixels.

After that, the through hole portion was etched again into the diameter of about 7 μm, and a common electrode 103 connected with the common electrode wiring 120 was formed on the through hole portion by patterning an ITO film. In the process, the interval between the pixel electrode 105 and the common electrode 103 was set to 7 μm. Further, the common electrodes 103 were formed in grid in such a manner as to cover the upper parts of the signal electrode 106, the scanning electrode 104 and the thin-film transistor 115 and define the pixel thereby to double as a light shield layer. In the process of forming each common electrode 103 having an alignment layer on the surface thereof, an electrode film about 80 nm thick was formed and six active matrix substrates were fabricated under various etching conditions.

As a result, the source electrodes 105 were arranged between three common electrodes 103 in a unit pixel as shown in FIG. 7A. Thus, an active matrix substrate was obtained configured of 1024×3 (corresponding to R, G, B) signal electrodes 106 and 768 scanning electrode 104 for a total of 1024×3×768 pixels.

Next, an alignment layer 109 about 70 nm thick was formed on the active matrix substrate and the other glass substrate 102 and processed to give the aligning function.

The two glass substrates were placed with the surfaces thereof having the alignment layers in opposed relation to each other, and a sealing agent was coated on the peripheral portion of the substrates. In this way, a liquid crystal display panel was assembled. The liquid crystal particles of the two glass substrates were arranged substantially parallel to each other, and the angle with the direction of the applied electric field was set to 75 degrees. A nematic liquid crystal substance A having a positive anisotropic dielectric constant Δ∈ of 10.2 F/m (1 kHz, 20° C.), an anisotropic index of refraction Δn of 0.075 (wavelength 590 nm, 20° C.), a torsional modulus of elasticity K2 of 7.0 pN and a nematic isotropic phase transition temperature T(N–I) of about 76° C. was injected into this liquid crystal display panel in vacuum and sealed with a sealant of ultraviolet photo-cured resin. A liquid crystal panel having the thickness (gap) of the liquid crystal layer of 4.2 μm was thus fabricated. The retardation (Δnd) of this panel is about 0.31 μm.

Using an alignment layer and a liquid crystal substance equivalent to those used for this liquid crystal display panel, a homogeneously aligned liquid crystal display panel was fabricated, and the pretilt angle of the liquid crystal measured by the crystal rotation method. The measurement was about 0.2 degrees. This panel was held between two polarizing plates 114, with the polarization transmission axis of one polarizing plate substantially parallel to the direction of liquid crystal particle alignment, while that of the other polarizing plate at right angles to the same direction. After that, a drive circuit and a backlight were connected into a module thereby to produce a liquid crystal display of active matrix type. According to this specific example, the normally black characteristic was introduced with dark display at low voltage and bright display at high voltage.

Next, the display quality of the six liquid crystal displays was evaluated, and it was confirmed that these liquid crystal displays are of two categories. In one category, the contrast ratio was 415 or more over the whole surface and the display uniformity was high. In the other category, the contrast ratio is less than 265, light leaks at the electrode edges and the display uniformity is low. With regard to these liquid crystal displays, the observation of the cross section under SEM and the measurement taken of the taper angle at the ends of the common electrode 103 having an alignment layer on the surface thereof showed that the display uniformity is satisfactory for the liquid crystal displays which satisfy the equation y>x/2 sin² θ and have the taper angles of 51, 58 and 72 degrees, while the other liquid crystal displays having the taper angles of 39, 41 and 48 cause light leakage and have a low display uniformity. Table 4 below shows the result of evaluation of the taper angle of the common electrode 103 and the contrast ratio.

TABLE 4

Taper angle and contrast ratio evaluation

| | Taper angle (degrees) | | | | | |
|---|---|---|---|---|---|---|
| | 72 | 58 | 51 | 48 | 41 | 39 |
| Contrast ratio | 434 | 421 | 415 | 262 | 243 | 228 |

It was confirmed that the lower the taper angle at the ends of the common electrode 103, the larger the area where light leaks for a worse display uniformity. The electrode thickness x, the electrode taper angle θ and the alignment layer thickness y were measured at positions shown in FIG. 9 based on the cross-sectional transmission electron micrograph.

Fifth Specific Example

A fifth specific example is explained with reference to FIG. 8. In fabricating a liquid crystal display according to the fifth specific example of the invention, a glass substrate 0.7 mm thick with a polished surface was used as glass substrates 101, 102. The thin-film transistor 115 is configured of source electrodes 105, a signal electrode 106, a scanning electrode 104 and a semiconductor film 116. The scanning electrode 104 is formed by patterning an aluminum film, and the common electrodes 120, the signal electrode 106 and the source electrodes 105 by patterning a chromium film. The gate insulating film 107 and the protective insulating film 108 are composed of silicon nitride and have the thickness of 0.3 μm. The resulting assembly was coated with acryl resin, and heat treated for one hour at 220° C. into a transparent organic insulating film 112 having a dielectric constant of about 4 F/m and a thickness of about 3.0 μm. This organic insulating film 112 flattened the unevenness due to the steps of the source electrodes 105 in the display area and the steps of the boundary portion between adjoining pixels.

Then, a cylindrical through hole about 10 μm in diameter reaching each source electrode 105 was formed by photolithography and etching as shown in FIG. 8, and the source electrode 105 connected with the source electrode 105 was formed on the through hole portion by patterning an ITO film. A cylindrical through hole about 10 μm in diameter was also formed for the common electrode wiring 120, and an ITO film was patterned on the resulting assembly thereby to form a common electrode 103. In the process, the interval between the source electrode 105 and the common electrode 103 was set to 7 μm, and the electrodes other than the scanning electrode 104 were formed into an electrode wiring pattern bent in zigzag. The angle of the bend was set to 10 degrees. The common electrodes 103 were formed in grid in such a manner as to cover the upper parts of the signal electrode 106, the scanning electrode 104 and the thin-film transistor 115 and define the pixels and thereby to double as a light shield layer. In the process of forming the source electrode 105 and the common electrode 103 having the alignment layer on the surface thereof, an electrode film about 80 nm thick was formed. In this way, six active matrix substrates having different tape angles of 33, 42, 46, 55, 61 and 71 degrees at the electrode ends could be test produced by variously changing the etching conditions.

As a result, like in the fourth specific example, the source electrodes 105 are arranged between three common electrodes 103 in a unit pixel except that two types of through holes are formed in a unit pixel. Thus, six active matrix substrates were obtained which are configured of 1024×3 (corresponding to R, G, B) signal electrodes 106 and 768 scanning electrodes 104 for a total of 1024×3×768 pixels.

Next, an alignment layer 109 about 70 nm thick was formed on the active matrix substrate and the other glass substrate 102 and processed to give the aligning function by a similar method to the first specific example.

Next, the display quality of the six liquid crystal displays was evaluated, and it was confirmed that these liquid crystal displays are of two categories. In one category, the contrast ratio was 420 or more over the whole surface and the display uniformity was high. In the other category, the contrast ratio is less than 245, light leaks at the electrode edges and the display uniformity is low. With retard to these liquid crystal displays, the observation of the cross section under SEM and the measurement taken of the taper angle at the ends of the common electrode 103 having an alignment layer on the surface thereof showed that the display uniformity is satisfactory for the liquid crystal displays which satisfy the equation $y > x/2 \sin^2 \theta$ and have the taper angles of 55, 61 and 75 degrees, while the other liquid crystal displays having the taper angles of 33, 42 and 46 cause light leakage and have a low display uniformity. Table 5 shows the result of evaluation of the taper angle of the source electrode 105 and the common electrode 103 and the contrast ratio.

TABLE 5

Taper angle and contrast ratio evaluation

| | Taper angle (degrees) | | | | | |
|---|---|---|---|---|---|---|
| | 75 | 61 | 55 | 46 | 42 | 33 |
| Contrast ratio | 433 | 429 | 421 | 243 | 216 | 178 |

It was confirmed that the smaller the taper angle at the ends of the common electrode 103 and the source electrode 105, the larger the area where light leaks for a worse display uniformity. The electrode film thickness x, the electrode taper angle θ and the alignment layer thickness y were measured at the positions shown in FIG. 9 based on the cross-sectional transmission electron micrograph.

Sixth Specific Example

According to the sixth specific example, like in the fifth specific example, eight IPS-TFT-LCDs were test produced. The thickness of the common electrode 103 and the source electrode 105 was about 60 nm, and the taper angle at the electrode ends was set to 45 degrees or more by adjusting the etching conditions. With regard to the electrodes including the scanning electrode 104, the common electrode wiring 120 and the signal electrode 106 under the organic insulating film 112, the taper angle at the electrode ends was set to less than 45 degrees. Also, the thickness of the alignment layer was set to 110 nm. In the six IPS-TFT-LCDS, the thickness of the organic insulating film 112 was set to 0.2, 0.4, 0.6, 0.8, 1.0, 1.5, 2.5 and 3.0, respectively.

The evaluation of the display quality of the eight IPS-TFT-LCDs is shown in Table 6.

TABLE 6

Organic insulating film thickness and contrast ratio evaluation

| | Organic insulating film thickness (μm) | | | | | | | |
|---|---|---|---|---|---|---|---|---|
| | 0.2 | 0.4 | 0.6 | 0.8 | 1.0 | 1.5 | 2.5 | 3.0 |
| Contrast ratio | 286 | 304 | 336 | 372 | 432 | 421 | 452 | 436 |

As understood from Table 6, the contrast ratio is stable at more than 430 for the IPS-TFT-LCD with the organic insulating film 1.0 μm or thicker. Once the thickness of the organic insulating film is reduced to less than 1.0 μm, however, the thinner the organic insulating film, the lower the contrast ratio for a worse display uniformity. The organic insulating film 112 absorbs the light incident to and the light reflected from the ends of the electrodes including and under the organic insulating film 112. Therefore, the thickness of the organic insulating film not less than 1.0 μm has no effect on the alignment layer 109. A thinner organic insulating film, however, apparently has an effect on the alignment layer.

The thickness of the organic insulating film is desirably not more than 4.0 μm.

Figure 9:
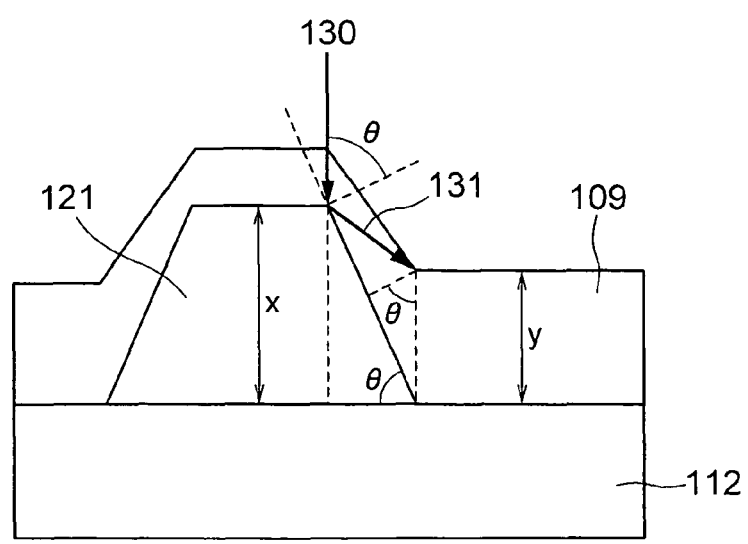
FIG. 9 is a diagram for explaining an equation defining the electrode thickness, the electrode taper angle and the alignment layer thickness according to the invention.
Figure 10:
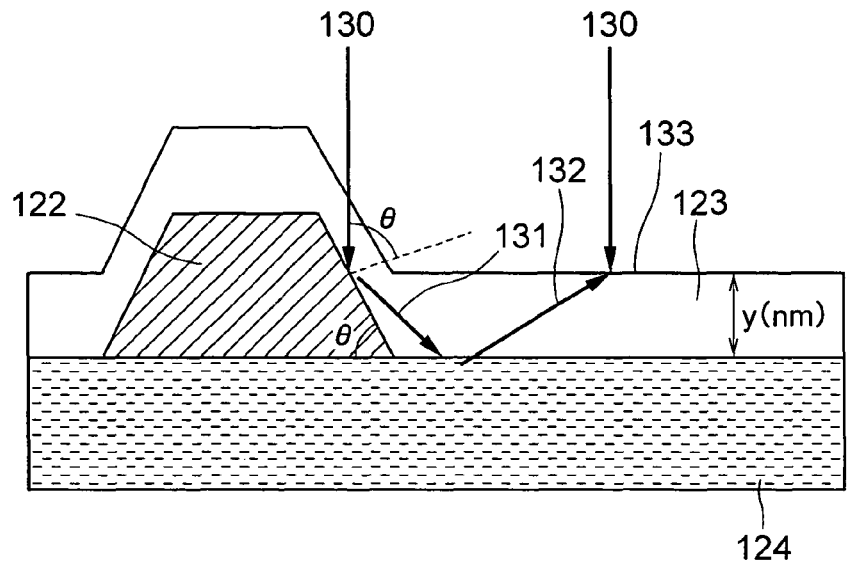
FIG. 10 is a diagram showing a case in which the ultraviolet light reflected on the electrode taper portion is radiated on the surface of the alignment layer through a different route than in FIGS. 2 and 3.

The electrode film thickness x, the electrode taper angle θ and the alignment layer thickness y were measured at the positions shown in FIG. 9 based on the cross-sectional transmission electron micrograph.

Seventh Specific Example

According to the seventh specific example, six IPS-TFT-LCDs were test produced in the same manner as in the fifth embodiment except that the substantially linearly polarized light is radiated at an incidence angle of 5 degrees in order to give the surface of the alignment layer 109 the ability to align the liquid crystal particles. The thickness of the common electrode 103 and the source electrode 105 was set to about 60 nm, and the thickness of the alignment layer 109 to 50 nm.

The display quality of these six liquid crystal displays was evaluated, and it was confirmed that these liquid crystal displays are of two categories. In one category, the contrast ratio was 400 or more over the whole surface and the display uniformity was high. In the other category, the contrast ratio is less than 210, light leaks at the electrode edges and the display uniformity is low. With regard to these liquid crystal displays, the observation of the cross section under SEM and the measurement taken of the taper angle of the ends of the common electrode 103 and the source electrode 105 having an alignment layer on the surface thereof showed that the display uniformity was high for the liquid crystal displays having the taper angles of 59, 68 degrees and the display uniformity is low for the liquid crystal displays having the taper angles of 35, 41, 47, 52 degrees. Table 7 shows the result of evaluation of the taper angle of the common electrode 103 and the source electrode 105 and the contrast ratio.

TABLE 7

Taper angle and contrast ratio evaluation

| Taper angle (degrees) | | | | | |
|---|---|---|---|---|---|
| 35 | 41 | 47 | 52 | 59 | 68 |
| Contrast ratio 141 | 152 | 183 | 208 | 404 | 418 |

It was confirmed that the lower the taper angle at the ends of the common electrode 103 and the source electrode 105, the larger the area where light leaks for a worse display uniformity. The electrode film thickness x, the electrode taper angle θ and the alignment layer thickness y were measured at positions shown in FIG. 9 based on the cross-sectional transmission electron micrograph.

The polarized light was radiated using two light sources with parallel polarization axes from two directions at the incidence angle of 5 degrees to the substrate. In this way, the IPS-TFT-LCD was test produced and evaluated. A similar trend to that of the evaluation result described above was confirmed.

Eighth Specific Example

According to the eighth specific example, like in the fifth specific example, one TFT substrate was fabricated, and six IPS-TFT-LCDs were test produced by dividing the particular substrate. In forming each alignment layer 109, the alignment layer varnish was coated by adjusting the concentration thereof, so that the thickness of the alignment layer 109 was changed sequentially.

The display quality of these six liquid crystal displays was evaluated, and it was confirmed that these liquid crystal displays are of two categories. In one category, the contrast ratio was 470 or more over the whole surface and the display uniformity was high. In the other category, the contrast ratio is less than 270, light leaks at the electrode edges and the display uniformity is low. The observation of the cross section of these six IPS-TFT-LCDs under SEM showed that since all of them are fabricated by dividing a single TFT substrate, the thickness of the common electrode 103 and the source electrode 105 is about 70 nm and the taper angle of the electrode ends about 48 degrees. Table 8 shows the result of evaluation of the thickness of the alignment layer and the common electrode 103 and the contrast ratio.

TABLE 8

Taper angle and contrast ratio evaluation

| | Alignment layer thickness (nm) | | | | | |
|---|---|---|---|---|---|---|
| | 25 | 37 | 51 | 65 | 82 | 117 |
| Contrast ratio | 198 | 231 | 266 | 476 | 506 | 497 |

The evaluation shows that the thinner the alignment layer 109, the larger the area where light leaks for a worse display uniformity. The electrode thickness x, the electrode taper angle θ and the alignment layer thickness y were measured at the positions shown in FIG. 9 based on the cross-sectional transmission electron micrograph.

Embodiments of the invention is explained below in detail with reference to the accompanying drawings. In the description that follows, the substrate formed with an active element such as a thin-film transistor is referred to as an active matrix substrate. An opposite substrate having a color filter, if any, may be referred to as a color filter substrate.

Figure 11:
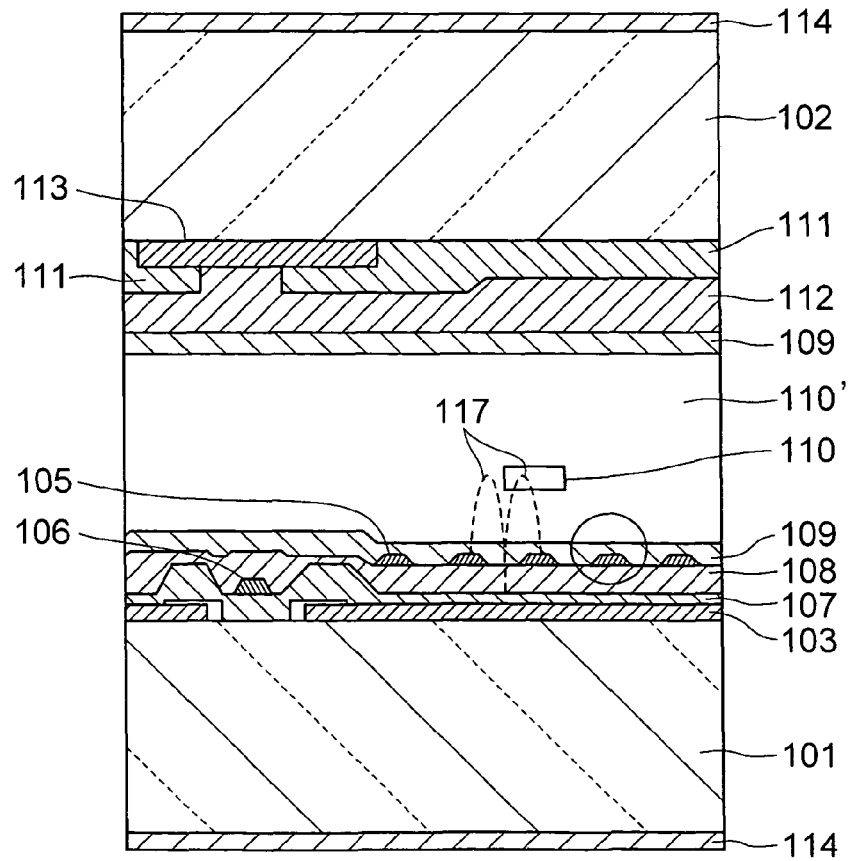
FIG. 11 is a sectional view of the pixel for explaining a pixel configuration according to an embodiment of the invention.
Figure 12:
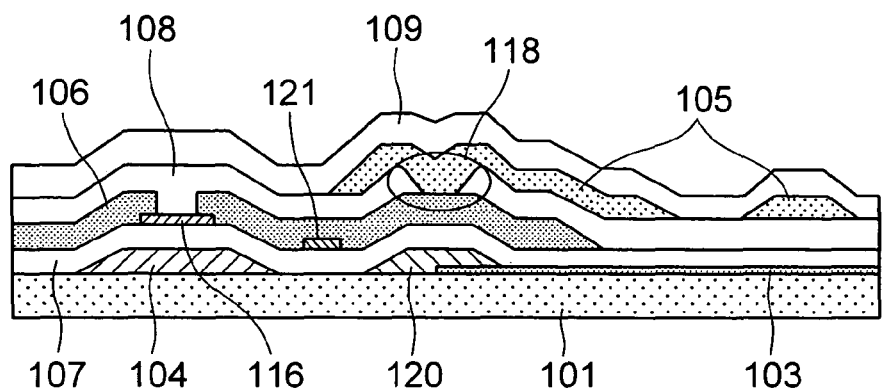
FIG. 12 is a sectional view of the pixel for explaining a pixel configuration according to an embodiment of the invention.
Figure 13:
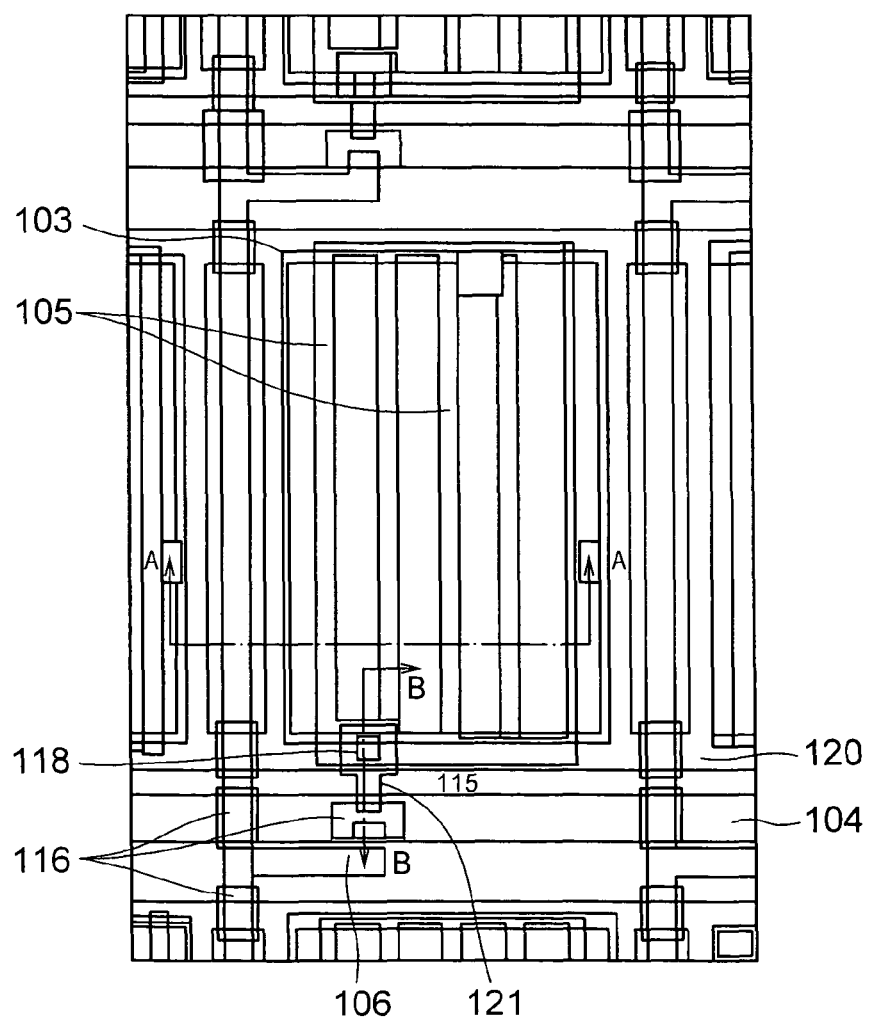
FIG. 13 is a plan view of the pixel for explaining a pixel configuration according to an embodiment of the invention.

FIGS. 11 and 12 are sectional views schematically showing a pixel and the neighborhood thereof for explaining a liquid crystal display according to an embodiment of the invention. FIG. 13 is a schematic diagram showing an active matrix substrate for explaining the configuration of a pixel and the neighborhood thereof of the liquid crystal display according to the embodiment of the invention. FIG. 11 is a sectional view taken in line A-A' in FIG. 13, and FIG. 12 a sectional view taken in line B-B' in FIG. 13.

In the liquid crystal display according to this embodiment, as shown in FIG. 12, a common electrode 103 of indium-tin-oxide (ITO) is arranged on the glass substrate 101 constituting an active matrix substrate. A scanning electrode (gate electrode) 104 of Mo.Al (molybdenum aluminum) and a common wiring (common electrode wiring) 120 are formed in superposition on the ITO common electrode. An insulating film 107 of silicon nitride is formed in such a manner as to cover the common electrode 103, the gate electrode 104 and the common electrode wiring 120. Also, a semiconductor film 116 of amorphous silicon or polysilicon is arranged through the insulating film 107 on the gate electrode 104. The semiconductor film 16 functions as an active layer of the thin-film transistor (TFT) constituting an active element. A signal electrode (drain electrode) 106 of Cr.Mo (chrome molybdenum) and a source electrode wiring 121 are arranged in superposition with a part of the pattern of the semiconductor film 116. A protective film 108 of silicon nitride is formed in such a manner as to cover all the components described above.

ITO source electrodes (pixel electrodes) 105 connected to a metal (Cr.Mo) source electrode (pixel electrode) wiring 121 via a through hole 118 formed through a protective insulating layer 108 are arranged on the protective insulating layer 108.

Also, as shown in FIG. 13, the ITO common electrode 103 assumes a tabular form in the area of each individual pixel in plan view, so that the ITO source electrodes 105 are formed in comb.

As described above, according to this embodiment, the common electrode 103 is arranged under the insulating film 107 underlying the protective insulating film 108, and the source electrodes 105 are arranged on the protective insulating film 108. Each individual pixel is configured in an area defined by a plurality of the source electrodes 105 and a single common electrode 103. An alignment layer 109 is formed on the surface of an active matrix substrate including a matrix of unit pixels configured in this way, i.e. the protective insulating film 108 formed with the source electrodes 105.

As shown in FIG. 11, on the other hand, the glass substrate 102 making up the opposite substrate is formed with a color filter 111 separated by a shield film (black matrix) 113 for each pixel. The color filter 111 and the shield film (black matrix) 113 are covered by an organic protective film 112 of a transparent insulating material. Further, the organic protective film 112 is formed with an alignment layer 109 and thus makes up a color filter substrate.

These alignment layers 109 use a high-pressure mercury lamp as a light source, and given the ability to align the liquid crystal particles by the radiation of the linearly polarized ultraviolet light derived from a pile-of-plates polarizer.

After a varnish-like solution is applied to the substrates, the alignment layer 109 is formed by removing the solvent in the baking process. In the case where the alignment layer is excessively thick, the varnish solvent cannot be sufficiently removed and remains in the film. This residual solvent melts into the liquid crystal layer and may cause a display defect. Therefore, the thickness of the alignment layer is also required to be taken into consideration.

The glass substrate 101 making up the active matrix substrate and the glass substrate 102 making up the opposite electrode are arranged with the surfaces of the alignment layers 109 in opposed relation to each other, and a liquid crystal layer (liquid crystal substance layer) 110' formed of liquid crystal particles is arranged between the glass substrates 101, 102. Also, a polarizing plate 114 is formed on each outer surface of the glass substrate 101 making up the active matrix substrate and the glass substrate 102 making up the opposite electrode.

In the way described above, a liquid crystal display of active matrix type (i.e. a TFT liquid crystal display) using a thin-film transistor is configured. In this TFT liquid crystal display, the liquid crystal particles 110 making up the liquid crystal substance layer 110' are aligned substantially parallel to the surfaces of the glass substrates 101, 102 arranged in opposed relation to each other in the absence of an electric field application, and homogeneously aligned in the direction of the initial alignment defined by the optical aligning process. Assume that the thin-film transistor (TFT) is turned on by applying a voltage to the gate electrode 104. Due to the potential difference between the source electrodes 105 and the common electrode 103, an electric field 117 is applied to the liquid crystal substance layer, so that the liquid crystal particles 110 making up the liquid crystal substance layer changes their direction along the electric field by the collaboration of the electric field and the anisotropic dielectric constant of the liquid crystal substance. At the same time, the anisotropic index of refraction of the liquid crystal substance layer and the function of the polarizing plate 114 combine to change the light transmittance for display on the liquid crystal display.

The organic insulating film 112 is formed of acryl resin or epoxy acryl resin superior in insulation characteristic and transparency, or a thermosetting resin such as polyimide. The organic insulating film 112 may alternatively be formed of a photo-cured transparent resin, or an inorganic material such as polysiloxane resin. Further, the organic insulating film 112 may double as an alignment layer 109.

In the embodiments of the invention described above, the insulating film 107 and the protective insulating film 108 may be formed of either organic or inorganic material superior in insulating characteristic and transparency. Taking the simplicity of handling and high reliability in the fabrication process into consideration, however, silicon nitride, silicon oxide or the like inorganic material is desirably employed.

In the embodiment of the invention described above, a plurality of display areas configured of the common electrodes and the source electrodes can be formed in each pixel. The provision of a plurality of the display areas can shorten the distance between the source electrodes and the common electrodes even in a large individual pixel. Therefore, the voltage applied to drive the liquid crystal can be reduced.

Also, according to this embodiment, the transparent conductive film making up at least one of the source electrode and the common electrode is formed of a material desirably including, though not specifically limited, a titanium oxide such as ion-doped indium-tin-oxide (ITO) or ion-doped zinc oxide for its machining ease and high reliability.

Generally, in the IPS system, unlike in the longitudinal field system such as the conventional TN system, the tilt angle of the boundary with the substrate surface is basically not required, and it is known that the smaller the boundary tilt angle, the better the angular field of view. Also in the optical alignment layer, therefore, the boundary tilt angle is desirably smaller, or more effectively not more than one degree.

Next, a specific example of the liquid crystal display according to the invention is explained. This liquid crystal display corresponds to the one explained in the embodiments described above.

Ninth Specific Example

A ninth specific example of the invention is explained in detail with reference to FIGS. 11, 12 and 13.

In fabricating a liquid crystal display according to the ninth specific example of the invention, a glass substrate 0.7 mm thick with a polished surface is used as a glass substrate 101 making up an active matrix substrate and a glass substrate 102 making up an opposite substrate (color filter substrate). A thin-film transistor 115 formed on the glass substrate 101 includes a source electrode wiring 121, a signal electrode 106, a scanning electrode 104 and a semiconductor films 116. The common electrodes 103 are formed by patterning ITO, and the scanning electrode 104, the common electrode wiring 120, the signal electrode 106 and the source electrode wiring 121 by patterning chromium. The taper angle at the ends of these electrodes is set to larger than 45 degrees but less than 90 degrees by adjusting the etching time. Although a low-resistance chromium film easy to pattern is used for the common electrodes 103 and the source electrodes 105, other alloys and ITO may alternatively be used. The insulating film 107 and the protective insulating film 108 are composed of silicon nitride and have a thickness of 0.3 μm.

Next, a through hole reaching the source electrode wiring 121 is formed as shown in FIG. 12 by photolithography and etching. The ITO source electrode 105 connected with the source electrode wiring 121 was patterned in the form of comb. The interval between the comb teeth of the source electrode 105 is set to 5 μm. In the process of forming the ITO source electrode 105, an electrode film having an electrode thickness (x) of about 70 nm was formed, and by adjusting the etching conditions, the taper angle (θ) at the electrode ends was set to larger than 45 degrees but less than 90 degrees. In this way, an active matrix substrate was fabricated.

As a result, as shown in FIG. 13, the source electrode 105 is arranged to have five comb teeth in a unit pixel (individual pixel). An active matrix substrate was formed of 1024×3 (for R, G, B) signal electrodes 106 and 768 scanning electrodes 104 for a total of 1024×3×768 pixels.

Next, each alignment layer is fabricated in the manner described below. Specifically, 4,4'-diamino azobenzene shown in formula [1] and 4,4'-diamino benzophenone shown in formula [2] are mixed with each other at the molar ratio of 6 to 4 thereby to obtain diamine. Also, pyromellitic acid anhydride shown in formula [3] and 1,2,3,4-cyclobutane tetra carbonic acid dianhydride shown in formula [4] are mixed with each other at the molar ratio of 1 to 1 thereby to obtain an anhydride. The polyamic varnish consisting of the diamine and the anhydride thus obtained is adjusted to the resin concentration of 5 wt %, NMP of 40 wt %, γ-butyl lactone of 40 wt % and butyl cellosolve of 15 wt %, and formed by printing on the active matrix substrate. After heat treatment for 30 minutes at 220° C., an alignment layer 109 of fine polyimide having a thickness of about 100 nm is formed.

In similar fashion, a columnar spacer of resin was formed by photolithography and etching on the surface of the glass substrate 102 making up the opposite substrate having a color filter formed thereon. Like the active matrix substrate, the surface of the columnar spacer was printed with polyamic varnish and heat treated for 30 minutes at 220° C. In this way, an alignment layer 109 of fine polyimide having a thickness (y) of about 100 nm was formed. In order to give the liquid crystal particle aligning ability to the surface of the alignment layer 109, the polarized ultraviolet (UV) light was radiated on the polyimide alignment layer 109 in the direction substantially perpendicular to the substrate. Using a high-pressure mercury lamp as a light source, the UV light in the wavelength range of 200 nm to 400 nm was derived through an interference filter and linearly polarized at the polarization ratio of about 10 to 1 using the pile-of-plates polarizer composed of a stack of quartz plates. This polarized light was radiated at the radiation energy of about 7 J/cm². As a result, the direction in which the liquid crystal particles on the surface of the alignment layer was found to be aligned at right angles to the direction of polarization of the polarized UV light radiated.

Next, these two glass substrates 101, 102 were placed in such a manner that the surfaces thereof having the alignment layer 109 capable of aligning the liquid crystal particles are in opposed relation to each other. The sealing agent was coated on the peripheral portion of the glass substrates. Thus, a liquid crystal display panel (also called the cell) making up a liquid crystal display was assembled. The liquid crystal particles on the glass substrates were arranged substantially parallel to each other at an angle of 75 degrees to the direction of application of the electric field. A nematic liquid crystal substance A having a positive anisotropic dielectric constant $\Delta \in$ of 10.2 (1 kHz, 20° C.), an anisotropic index of refraction Δn of 0.075 (wavelength 590 nm, 20° C.), a torsional modulus of elasticity K2 of 7.0 pN and a nematic isotropic phase transition temperature T(N–I) of about 76° C. was injected into the cell in vacuum and sealed with a sealant of ultraviolet photo-cured resin. A liquid crystal panel having the thickness (gap) of the liquid crystal layer of 4.2 μm was fabricated.

The retardation Δnd of this liquid crystal panel was about 0.31 μm. Also, a homogeneously aligned liquid crystal display panel was fabricated using an alignment layer and a liquid crystal substance equivalent to those of this panel. The pretilt angle of the liquid crystal was measured by the crystal rotation method, and the figure of about 0.2 degrees was obtained. This liquid crystal display panel was held between two polarizing plates 114 and arranged with the polarized light transmission axis of one polarizing plate substantially parallel to the direction of alignment of the liquid crystal particles and the polarized light transmission axis of the other polarizing plate at right angles thereto. After that, a drive circuit and a backlight are connected into a module. In this way, a liquid crystal display of active matrix type was obtained. The liquid crystal display according to this embodiment has a normally black characteristic in which display is dark at low voltage and bright at high voltage.

In the manner described above, six liquid crystal displays were fabricated and the display quality thereof evaluated. It was found that the contrast ratio was not less than 410 over the whole surface with a satisfactory display uniformity. It was thus confirmed that a liquid crystal display having a high display uniformity can be fabricated in stable fashion on the conditions described above. Comparison of contrast ratio between the six liquid crystal displays fabricated according to this specific example is shown in Table 9 below.

TABLE 9

| Evaluation of LCD contrast ratio | | | | | | |
|---|---|---|---|---|---|---|
| | LCD | | | | | |
| | 1 | 2 | 3 | 4 | 5 | 6 |
| Contrast ratio | 433 | 423 | 412 | 416 | 427 | 441 |

Tenth Specific Example

According to the tenth specific example, the thickness (x) of the ITO source electrode 105 having the alignment layer 109 on the surface thereof was set to 25 nm, the taper angle (θ) at the electrode ends to larger than 45 degrees but less than 90 degrees, and the thickness (y) of the alignment layer 109 to about 25 nm. In other points, the six liquid crystal displays were fabricated in similar manner to the ninth specific example.

Comparison of the display quality of the six liquid crystal displays shows that the contrast ratio is not less than 420 over the whole surface with a satisfactory display uniformity. It was thus confirmed that a liquid crystal display of high display uniformity can be fabricated in stable fashion on the conditions described above. The result of evaluating the contrast ratio of the six liquid crystal displays fabricated according to this specific example is shown in Table 10 below.

TABLE 10

| Evaluation of LCD contrast ratio | | | | | | |
|---|---|---|---|---|---|---|
| | LCD | | | | | |
| | 1 | 2 | 3 | 4 | 5 | 6 |
| Contrast ratio | 448 | 434 | 436 | 425 | 443 | 437 |

First Comparative Example

In the first comparative example, the taper angle (θ) at the ends of the ITO source electrode 105 having the alignment layer 109 on the surface thereof was set to smaller than 45 degrees by adjusting the etching conditions. In other points, six liquid crystal displays were fabricated in a similar manner to the tenth specific example.

Comparison of the display quality of the six liquid crystal displays shows that the contrast ratio is not more than 220 over the whole surface with an unsatisfactory display uniformity. It was thus confirmed that it is difficult to fabricate a liquid crystal display of high display uniformity in stable fashion on the conditions described above. The result of evaluating the contrast ratio of the six liquid crystal displays fabricated according to this specific example is shown in Table 11 below.

TABLE 11

Evaluation of LCD contrast ratio

| | LCD | | | | | |
|---|---|---|---|---|---|---|
| | 1 | 2 | 3 | 4 | 5 | 6 |
| Contrast ratio | 198 | 202 | 214 | 163 | 172 | 156 |

Eleventh Specific Example

In the eleventh specific example, the thickness (x) of the source electrode 105 having the alignment layer 109 on the surface thereof was set to 90 nm, and the thickness (y) of the alignment layer 109 to about 70 nm. In patterning and etching the ITO source electrodes 105, the taper angle (θ) at the ends of the source electrode 105 was changed in a series by changing the etching conditions. In other points, the six liquid crystal displays were thus fabricated on the same conditions as the first ninth example.

Next, the display quality of these six liquid crystal displays was evaluated, and it was confirmed that these liquid crystal displays are of two categories. In one category, the contrast ratio was 420 or more over the whole surface and the display uniformity was high. In the other category, it was confirmed that the contrast ratio is less than 230, light leaks at the electrode edges and the display uniformity is low. The observation of the cross section of these liquid crystal displays under SEM and the measurement taken of the taper angle at the ends of the source electrode 105 having an alignment layer on the surface thereof showed that the taper angles are 71, 62, 55 degrees satisfying the equation $y > x/2 \sin^2 \theta$ for the liquid crystal displays having a satisfactory display quality, while the taper angles are 51, 43, 36 degrees for the liquid crystal displays which cause light leakage and have a low display uniformity. Table 12 shows the result of evaluation of the taper angle (θ) of the source electrode 105 and the contrast ratio.

TABLE 12

Taper angle and contrast ratio evaluation

| | Taper angle (degrees) | | | | | |
|---|---|---|---|---|---|---|
| | 71 | 62 | 55 | 51 | 43 | 36 |
| Contrast ratio | 427 | 434 | 425 | 221 | 203 | 187 |

It was also confirmed that the smaller the taper angle (θ) at the ends of the source electrode 105, the larger the area where light leaks with an unsatisfactory display uniformity.

Twelfth Specific Example

In the twelfth specific example, the source electrode 105 plotted to have linear comb teeth in FIG. 13 was patterned as a shape bent at an angle of 160 degrees, and the polarized ultraviolet light was radiated to tilt the liquid crystal particles 110 by 80 degrees from the electric field. The thickness (x) of the source electrode 105 was set to 9 nm, and the thickness (y) of the alignment layer 109 to about 60 nm. Also, the taper angle (θ) at the ends of the source electrode 105 was changed in a series by changing the etching conditions in etching by patterning the ITO source electrode 105. The other conditions for fabricating the six liquid crystal displays were similar to those in the ninth specific example.

Next, the display quality of the six liquid crystal displays was evaluated, and it was confirmed that these liquid crystal displays are of two categories. In one category, the contrast ratio was 400 or more over the whole surface and the display uniformity was high. In the other category, the contrast ratio is less than 250, light leaks at the electrode edges and the display uniformity is low. With regard to these liquid crystal displays, the observation of the cross section under SEM and the measurement taken of the taper angle at the ends of the source electrode 105 having an alignment layer on the surface thereof showed that the display uniformity is satisfactory for the liquid crystal displays which have the taper angles of 73 and 63 degrees satisfying the equation $y > x/2 \sin^2 \theta$, while the other liquid crystal displays having the taper angles of 55, 47, 41 and 38 cause light leakage and have a low display uniformity. Table 13 shows the result of evaluation of the taper angle (θ) and the contrast ratio of the source electrodes 105.

TABLE 13

Taper angle and contrast ratio evaluation

| | Taper angle (degrees) | | | | | |
|---|---|---|---|---|---|---|
| | 73 | 63 | 55 | 47 | 41 | 38 |
| Contrast ratio | 415 | 410 | 249 | 231 | 181 | 173 |

It was also confirmed that the smaller the taper angle (θ) at the ends of the source electrodes 105, the larger the area where light leaks with an unsatisfactory display uniformity.

Thirteenth Specific Example

In the thirteenth specific example, the thickness (x) of the source electrodes 105 having an alignment layer 109 on the surface thereof was set to 30 nm, and two active matrix substrates having the taper angles (θ) of 58 and 66 degrees at the ends of the source electrodes 105 were fabricated by patterning and etching the ITO source electrodes under various etching conditions. Six active matrix substrates were cut out from each of the two substrates, and by changing the thickness (y) of the alignment layer 109 in a series, a total of 12 liquid crystal displays were fabricated. The other conditions for fabrication were the same as in the ninth specific example.

Next, the display quality of the 12 liquid crystal displays was evaluated, and it was confirmed that these liquid crystal displays can be divided into two categories. In one category, the contrast ratio was 400 or more over the whole surface and the display uniformity was high. In the other category, the contrast ratio is less than 310, light leaks at the electrode edges and the display uniformity is low. The cross section of these liquid crystal displays was observed under SEM and the thickness (y) of the alignment layer measured. The contrast ratio of these liquid crystal displays is shown collectively in Table 14.

TABLE 14

Contrast ratio evaluation

|  |  | Alignment layer thickness (y) | | | | | |
|---|---|---|---|---|---|---|---|
|  |  | 10 nm | 17 nm | 24 nm | 30 nm | 44 nm | 55 nm |
| Taper angle (θ) | 58° | 154 | 230 | 403 | 420 | 414 | 423 |
|  | 66° | 95 | 183 | 268 | 303 | 404 | 421 |

This measurement indicates that in the case where the protective insulating film 112 underlying the alignment layer 109 is formed of an inorganic material such as silicon nitride, the path of double reflection shown in FIG. 5 also requires consideration, and therefore the relation between the alignment layer thickness y and the taper angle θ is important.

Taking advantage of the fact that the alignment layer 109 itself absorbs the wavelength contributing to the reaction in a system where the double reflection cannot be ignored, it was confirmed that a high-quality liquid crystal display having a contrast ratio of 400 or more can be fabricated under the conditions of y>100/(1−1/cos 2θ).

Fourteenth Specific Example

In the fourteenth specific example, the thickness (x) of the source electrodes 105 having an alignment layer 109 on the surface thereof was set to 50 nm, and three active matrix substrates having the taper angles (θ) of 33, 38 and 42 degrees at the ends of the source electrodes 105 were fabricated by patterning and etching the ITO source electrodes 105 under various etching conditions. Six active matrix substrates were cut out from each of the three substrates, and by changing the thickness (y) of the alignment layer 109 in a series, a total of 18 liquid crystal displays were fabricated. The other conditions for fabrication were the same as in the ninth specific example.

Next, the display quality of the 18 liquid crystal displays was evaluated, and it was confirmed that these liquid crystal displays could be divided into two categories. In one category, the contrast ratio was 400 or more over the whole surface and the display uniformity was high. In the other category, the contrast ratio is less than 350, light leaks at the electrode edges and the display uniformity is low. The cross section of these liquid crystal displays was observed under SEM and the thickness (y) of the alignment layer measured. The contrast ratio of these liquid crystal displays is shown collectively in Table 15.

TABLE 15

Contrast ratio evaluation

|  |  | Alignment layer thickness (y) | | | | | |
|---|---|---|---|---|---|---|---|
|  |  | 12 nm | 25 nm | 38 nm | 46 nm | 50 nm | 61 nm |
| Taper angle (θ) | 33° | 88 | 145 | 211 | 310 | 407 | 412 |
|  | 38° | 79 | 162 | 226 | 323 | 418 | 409 |
|  | 42° | 97 | 165 | 244 | 342 | 409 | 415 |

From this measurement, it was confirmed that even in the case where the light reflected on the taper portion of the source electrodes 105 is radiated directly on the surface of the alignment layer 109, no considerable effect is had as the alignment layer 109 itself absorbs the radiation as long as the thickness of the alignment layer is not less than 50 nm. In the case where the taper angle θ of the electrodes having the alignment layer 109 on the surface thereof is 0 to 45 degrees inclusive, a high-quality liquid crystal display having a contrast ratio of 400 or more can be fabricated in stable fashion as long as the thickness y of the alignment layer 109 is not less than 50 nm.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:
1. A liquid crystal display comprising:
a first substrate and a second substrate;
a liquid crystal layer arranged between the first substrate and the second substrate;
a first electrode and a second electrode formed on the first substrate to apply an electric field to the liquid crystal layer;
a plurality of active elements connected to the first electrode;
a color filter and a black matrix formed on the second substrate;
an alignment layer including polyimide formed in contact with the liquid crystal layer; and
a pair of polarizing plates to change the optical characteristics in accordance with the alignment of the molecules of the liquid crystal layer between the first substrate and the second substrate;
wherein:
the first electrode and the second electrode are bent,
the taper angle at the ends of the first electrode located in the display area is larger than 45 degrees but less than 90 degrees,
the alignment layer is formed of a material capable of controlling the alignment of the liquid crystal particles by the radiation of substantially linearly polarized light;
the relation $y > x/2 \sin^2 \theta$ holds, where x is the thickness of the first electrode and has a value of 1-100 nm, θ is the taper angle at the ends of the first electrode, and y is the thickness of the alignment layer measured from the lower surface of the end of the first electrode to the alignment layer surface contacting the liquid crystal layer after the substrate on which the alignment layer is applied has been cut and burned by a focused ion beam, and y satisfies the relationship 44 nm<y≦117 nm;
the first electrode is comb-shaped; and
the alignment layer is formed on the surface of the first electrode.
2. A liquid crystal display according to claim 1, wherein the electric field applied to the liquid crystal layer is substantially parallel to the surface of the first substrate and the second substrate.
3. A liquid crystal display according to claim 1, wherein the first electrode is a source electrode and the second electrode is a common electrode.

4. A liquid crystal display according to claim 1,
wherein the alignment layer is formed on the surface of the second electrode.

5. A liquid crystal display according to claim 4, wherein:
the second electrode is formed on an organic insulating film, and
the alignment layer is formed on the organic insulating layer and the second electrode.

6. A liquid crystal display according to claim 1, wherein:
the first electrode and the second electrode are formed on an organic insulating layer, and
the alignment layer is formed on the organic insulating layer, the first electrode, and the second electrode.

7. A liquid crystal display according to claim 5, wherein the organic insulating layer is 1 μm or thicker.

8. A liquid crystal display according to claim 1, wherein the alignment layer is thicker than the first electrode.

9. A liquid crystal display comprising:
a first substrate and a second substrate;
a liquid crystal layer arranged between the first substrate and the second substrate;
a first electrode and a second electrode formed on the first substrate to apply an electric field to the liquid crystal layer; and
a plurality of active elements connected to the first electrode;
a color filter and a black matrix formed on the second substrate;
an alignment layer including polyimide formed in contact with the liquid crystal layer; and
a pair of polarizing plates to change the optical characteristics in accordance with the alignment of the molecules of the liquid crystal layer between the first substrate and the second substrate;
wherein:
a film thickness of the first electrode is 1 nm-100 nm,
the first electrode is a comb-shaped first electrode and the second electrode has a tabular form,
the alignment layer is formed on the surface of the first electrode,
an inorganic insulating layer is arranged between said second electrode and the first electrode,
the taper angle at the ends of the first electrode is larger than 45 degrees but less than 90 degrees,
the alignment layer is composed of a material capable of controlling the alignment of the liquid crystal particles by the radiation of substantially linearly polarized light, and
the relation y>100/(1−1/cos 2θ) holds, where θ is the taper angle at the ends of the first electrode, and y is the thickness of each of the alignment layer measured from the lower surface of the end of the first electrode to the alignment layer surface contacting the liquid crystal layer and satisfies the relationship 44 nm<y≦117 nm.

10. A liquid crystal display according to claim 9, wherein the taper angle at the ends of the first electrode is greater than 58 degrees but less than 90 degrees.

11. A liquid crystal display according to claim 9, wherein the inorganic insulating layer is formed of selected one of silicon nitride and silicon oxide.

12. A liquid crystal display according to claim 9, wherein the polarization axis of the substantially linearly polarized light which radiates the first electrode and the polarization axis of the substantially linearly polarized light reflected from the first electrode are displaced from each other.

13. A liquid crystal display according to claim 9, wherein the first electrode is bent.

14. A liquid crystal display according to claim 1, wherein the taper angle at the ends of the first electrode located in the display area is larger than 45 degrees but less than 75 degrees.

15. A liquid crystal display according to claim 1, wherein the polarization axis of the substantially linearly polarized light directly radiated and that of the reflected light are displaced from each other.

16. A liquid crystal display according to claim 9, wherein the polarization axis of the substantially linearly polarized light directly radiated and that of the reflected light are displaced from each other.

* * * * *